United States Patent
Ozawa et al.

(10) Patent No.: US 10,230,249 B2
(45) Date of Patent: Mar. 12, 2019

(54) BATTERY PACK, METHOD FOR CHARGING/DISCHARGING SAME, AND POWER CONSUMPTION DEVICE

(75) Inventors: Atsushi Ozawa, Kanagawa (JP); Kazuo Nakamura, Kanagawa (JP); Shin Hotta, Tokyo (JP); Kentaro Marutani, Kanagawa (JP); Shinichi Uesaka, Kanagawa (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 662 days.

(21) Appl. No.: 13/879,580

(22) PCT Filed: Sep. 8, 2011

(86) PCT No.: PCT/JP2011/070453
§ 371 (c)(1),
(2), (4) Date: Apr. 15, 2013

(87) PCT Pub. No.: WO2012/053292
PCT Pub. Date: Apr. 26, 2012

(65) Prior Publication Data
US 2013/0200848 A1 Aug. 8, 2013

(30) Foreign Application Priority Data
Oct. 20, 2010 (JP) .................................. 2010-235129

(51) Int. Cl.
| | | |
|---|---|---|
| *H02J 7/00* | (2006.01) | |
| *B60L 11/18* | (2006.01) | |
| *H02J 7/04* | (2006.01) | |
| *H01M 10/44* | (2006.01) | |

(52) U.S. Cl.
CPC ......... *H02J 7/0029* (2013.01); *B60L 11/1855* (2013.01); *H01M 10/441* (2013.01);
(Continued)

(58) Field of Classification Search
USPC ........................................................ 320/117
See application file for complete search history.

(56) References Cited

U.S. PATENT DOCUMENTS

| | | | | |
|---|---|---|---|---|
| 5,235,232 A | * | 8/1993 | Conley | ..................... G21H 1/12 |
| | | | | 323/906 |
| 5,744,936 A | * | 4/1998 | Kawakami | ........ H01M 10/4207 |
| | | | | 320/120 |

(Continued)

FOREIGN PATENT DOCUMENTS

| | | |
|---|---|---|
| EP | 0609101 | 6/2002 |
| JP | 6-225463 | 8/1994 |
| JP | 9-285028 | 10/1997 |
| JP | 3331529 | 10/2002 |

OTHER PUBLICATIONS

European Search Report dated Jun. 24, 2014, for corresponding European Appln. No. 11834134.6.

(Continued)

*Primary Examiner* — Robert Grant
(74) *Attorney, Agent, or Firm* — Chip Law Group

(57) ABSTRACT

Provided is a method for charging/discharging a battery pack having an auxiliary charging/discharging device and a battery assembly in which a plurality of secondary battery cell parallel modules, each of which includes a plurality of fasecondary battery cells connected in parallel, are connected in series, the method including, when there is no abnormality in the secondary battery cells during charging/discharging, connecting the auxiliary charging/discharging device in parallel to any of the secondary battery cell parallel modules, and when there is an abnormality in any of the secondary battery cells during charging/discharging, releasing connection to the secondary battery cell at which the abnormality has arisen in the secondary battery cell parallel module including the secondary battery cell at which the abnormality has arisen, and connecting the auxiliary charg- (Continued)

ing/discharging device in parallel to the secondary battery cell parallel module including the secondary battery cell at which the abnormality has arisen.

18 Claims, 15 Drawing Sheets

(52) U.S. Cl.
CPC .......... *H02J 7/0019* (2013.01); *H02J 7/0024* (2013.01); *H02J 7/045* (2013.01); *B60L 2200/26* (2013.01); *Y02T 10/7005* (2013.01); *Y02T 10/705* (2013.01)

(56) References Cited

U.S. PATENT DOCUMENTS

| | | | |
|---|---|---|---|
| 5,880,575 | A | 3/1999 | Itou et al. |
| 2009/0072793 | A1* | 3/2009 | Chang ................ B60L 11/1809 320/134 |
| 2009/0079265 | A1 | 3/2009 | Seligman |
| 2010/0007308 | A1* | 1/2010 | Lee ...................... H02J 7/0018 320/118 |
| 2010/0261043 | A1 | 10/2010 | Kim et al. |

OTHER PUBLICATIONS

Notification of the First Office Action issued in connection with Chinese Patent Application No. 2011800495920, dated Nov. 3, 2014. (19 pages).

\* cited by examiner

[THERE IS ABNORMALITY IN SECONDARY BATTERY CELL $12_{52}$]

(A)

(B) [DURING CHARGING]

(C) [DURING DISCHARGING]

[THERE IS ABNORMALITY IN SECONDARY BATTERY CELL $12D_2$]

[DURING CHARGING]

[DURING DISCHARGING]

(A)

(B)

BATTERY PACK, METHOD FOR CHARGING/DISCHARGING SAME, AND POWER CONSUMPTION DEVICE

CROSS REFERENCES TO RELATED APPLICATIONS

The present application is a national stage of International Application No. PCT/JP2011/070453 filed on Sep. 8, 2011 and claims priority to Japanese Patent Application No. 2010-235129 filed on Oct. 20, 2010, the disclosure of which is incorporated herein by reference.

BACKGROUND

The present disclosure relates to a battery pack, a method for charging/discharging the same, and a power consumption device.

A battery pack has already been used for a variety of portable devices such as mobile phones, digital still cameras, handheld game consoles, laptop personal computers, and electric tools. Thus, at present, not being limited to this, the battery pack is being used in fields that require higher output and higher capacity such as electric power-assisted bicycles and electric automobiles, and furthermore, household electric storage devices.

As a secondary battery cell incorporated in the battery pack, one of the most commonly used cells at present is a lithium-ion secondary battery cell. The lithium-ion secondary battery cell has a very wide range of uses due to a number of characteristics, such as that it can be repetitively used by charge, that it has high-voltage output, that it has high energy density, that it has low self-discharge, and that it has long service life. Further, to meet requirements of devices for higher output and higher capacity, cases of making the secondary battery cells (single cells) into multiple serial connections and multiple parallel connections and using them in the form of a battery assembly are also increasing. This usage has a great advantage but causes a processed quantity of energy to be greatly increased. As such, there is a need to more appropriately deal with the usage than has been done conventionally.

Typically, the secondary battery cell is provided with a protection circuit so as to monitor the conditions of overcharge, overdischarge, overcurrent, and temperature, and not to be used in dangerous conditions or to cause characteristic degradation. Thus, conventionally, when the protection circuit operates, a charge/discharge operation of the battery pack as a whole is stopped, and thereby a protective function is realized.

However, in the battery pack having a plurality of secondary battery cells, due to an abnormality of only one secondary battery cell or some of the secondary battery cells, performing a protective operation of the entire battery pack causes operations of all of various devices (called "power consumption devices"), which are supplied with power from the battery pack, to be stopped. For this reason, the disconnection of the secondary battery cell(s) at which the abnormality has arisen from the battery assembly is taken into consideration. However, when the secondary battery cells are connected in series, all of the secondary battery cells connected in series are out of use (see FIG. 15(A)).

An electric storage device for solving this problem is well known from Japanese Patent No. 3331529. This electric storage device is configured so that a plurality of secondary batteries are connected in parallel and/or series in an array shape, and is characterized by including means for detecting abnormality of each secondary battery, means for electrically disconnecting an output terminal of the secondary battery at which the abnormality has arisen and simultaneously short-circuiting a terminal to which the abnormal secondary battery is connected in the case of serial connection, means for compensating for voltage in proportion to the disconnected battery, and a diode for preventing counter current.

CITATION LIST

Patent Literature

Patent Literature 1: Japanese Patent No. 3331529

SUMMARY

Technical Problem

Incidentally, when the secondary battery cells are connected in parallel, for example when an abnormality has arisen at one secondary battery cell, the power supplied to the power consumption device is reduced in proportion to one secondary battery cell, and a burden of the normal secondary battery cell is increased (see FIG. 15(B)). There is a risk of exerting a bad influence on operating time and characteristics of the secondary battery cell. In the electric storage device disclosed in Japanese Patent No. 3331529, this problem that the burden of load of the normal secondary battery cell is increased in the case of the parallel connection is not considered. Further, there are problems that the means for compensating for voltage in proportion to the disconnected battery is of no use without any contribution to the electric storage device until the disconnection of the secondary battery cell occurs, and that efficient charging/discharging of the entire electric storage device is not achieved.

Accordingly, the present disclosure suggests a battery pack capable of achieving efficient charging/discharging of the entire battery pack in which a plurality of secondary battery cells are connected, a method for charging/discharging the same, and a power consumption device into which such a battery pack is incorporated.

Solution to Problem

According to a first aspect of the present disclosure, there is provided a battery pack, which includes: a battery assembly in which a plurality of secondary battery cell parallel modules, each of which includes a plurality of secondary battery cells connected in parallel, are connected in series; and an auxiliary charging/discharging device, wherein the auxiliary charging/discharging device is connected in parallel to an arbitrary one of the secondary battery cell parallel modules.

Further, according to a second aspect of the present disclosure, there is provided a battery pack, which includes: a secondary battery cell serial module including a plurality of secondary battery cells connected in series; and an auxiliary charging/discharging device, wherein, when there is no abnormality in the secondary battery cells during charging/discharging, the auxiliary charging/discharging device is connected in parallel to any of the secondary battery cells, and wherein, when there is an abnormality in any of the secondary battery cells during charging/discharging, the secondary battery cell at which the abnormality has arisen is disconnected from the secondary battery cell serial module, and the auxiliary charging/discharging device is connected in series to the secondary battery cell serial module.

Further, according to a third aspect of the present disclosure, there is provided a battery pack, which includes:

a battery assembly in which a plurality of secondary battery cell parallel modules, each of which includes a plurality of secondary battery cells connected in parallel, are connected in series;

a charging/discharging control circuit connected to the battery assembly via a connecting part; and a voltage measurement device and an auxiliary charging/discharging device tapped from the connecting part and connected to the battery assembly, wherein the voltage measurement device measures voltages across the secondary battery cell parallel modules.

Also, according to the first aspect of the present disclosure, there is provided a method for charging/discharging a battery pack, in which the battery pack includes an auxiliary charging/discharging device and a battery assembly in which a plurality of secondary battery cell parallel modules, each of which includes a plurality of secondary battery cells connected in parallel, are connected in series, the method includes:

when there is no abnormality in the secondary battery cells during charging/discharging, connecting the auxiliary charging/discharging device in parallel to any of the secondary battery cell parallel modules; and when there is an abnormality in any of the secondary battery cells during charging/discharging, releasing connection to the secondary battery cell at which the abnormality has arisen in the secondary battery cell parallel module including the secondary battery cell at which the abnormality has arisen, and connecting the auxiliary charging/discharging device in parallel to the secondary battery cell parallel module including the secondary battery cell at which the abnormality has arisen.

Further, according to the second aspect of the present disclosure, there is provided a method for charging/discharging a battery pack, in which the battery pack includes an auxiliary charging/discharging device and a secondary battery cell serial module including a plurality of secondary battery cells connected in series, the method includes:

when there is no abnormality in the secondary battery cells during charging/discharging, connecting the auxiliary charging/discharging device in parallel to any of the secondary battery cells; and when there is an abnormality in any of the secondary battery cells during charging/discharging, short-circuiting both ends of the secondary battery cell at which the abnormality has arisen, and connecting the auxiliary charging/discharging device in series to the secondary battery cell serial module.

Advantageous Effects of Invention

In the battery pack according to the first aspect of the present technology, the auxiliary charging/discharging device is connected in parallel to an arbitrary one of the secondary battery cell parallel modules. Further, in the battery pack according to the second aspect of the present technology, during charging/discharging, when there is no abnormality in the secondary battery cells, the auxiliary charging/discharging device is connected in parallel to any of the secondary battery cells. Furthermore, in the battery pack according to the third aspect of the present technology, the voltage measurement device and the auxiliary charging/discharging device are provided. As such, during charging/discharging of the secondary battery cells, the auxiliary charging/discharging device can also contribute to the charge/discharge, and the optimization of cell balance in charging/discharging the entire battery pack in which the plurality of secondary battery cells are connected can be achieved. The efficiency of the entire battery pack can be achieved. Furthermore, in the battery pack according to the second aspect of the present technology, during charging/discharging, when there is an abnormality in any of the secondary battery cells, the secondary battery cell at which the abnormality has arisen is disconnected from the secondary battery cell serial module, and the auxiliary charging/discharging device is connected in series to the secondary battery cell serial module. As such, it is not necessary to stop the use of the battery pack. Furthermore, the auxiliary charging/discharging device functions as a protection device combining redundancy, and a greater burden is not imposed on the secondary battery cell constituting the secondary battery cell serial module.

In the method for charging/discharging the battery pack according to the first aspect of the present technology, during charging/discharging, when there is no abnormality in the secondary battery cells, the auxiliary charging/discharging device is connected in parallel to any of the secondary battery cell parallel modules. Further, in the method for charging/discharging the battery pack according to the second aspect of the present technology, during charging/discharging, when there is no abnormality in the secondary battery cells, the auxiliary charging/discharging device is connected in parallel to any of the secondary battery cells. As such, during charging/discharging of the secondary battery cells, the auxiliary charging/discharging device can also contribute to the charge/discharge, and the optimization of cell balance in charging/discharging the entire battery pack in which the plurality of secondary battery cells are connected can be achieved. The efficiency of the entire battery pack can be achieved. Furthermore, in the method for charging/discharging the battery pack according to the first aspect of the present technology, during charging/discharging, when there is an abnormality in any of the secondary battery cells, the connection to the secondary battery cell at which the abnormality has arisen is released in the secondary battery cell parallel module including the secondary battery cell at which the abnormality has arisen, and the auxiliary charging/discharging device is connected in parallel to the secondary battery cell parallel module including the secondary battery cell at which the abnormality has arisen. In the method for charging/discharging the battery pack according to the second aspect of the present technology, during charging/discharging, when there is an abnormality in any of the secondary battery cells, the both ends of the secondary battery cell at which the abnormality has arisen are short-circuited, and the auxiliary charging/discharging device is connected in series to the secondary battery cell serial module. As such, it is not necessary to stop the use of the battery pack. Furthermore, the auxiliary charging/discharging device functions as a protection device combining redundancy, and a greater burden is not imposed on the secondary battery cell constituting the secondary battery cell module.

As described above, in the present technology, no special charge or management mechanism is required for the auxiliary charging/discharging device. The auxiliary charging/discharging device can be used as a part of the battery pack. In addition to this, the equilibrium of cell balance can be efficiently achieved. Furthermore, since the secondary battery cell and the auxiliary charging/discharging device are synchronized in a use state, when the abnormality of the secondary battery cell occurs, the replacement of the auxiliary charging/discharging device can be smoothly performed. Due to easy control, the redundancy of the secondary battery cell can be remarkably increased.

Furthermore, in the power consumption device of the present technology which will be described below, the battery pack according to the first to third aspects of the present technology is provided. As such, the power consumption device can produce effects similar to the above-mentioned effects which the battery pack according to the first to third aspects of the present technology has.

Additional features and advantages are described herein, and will be apparent from the following Detailed Description and the figures.

DETAILED DESCRIPTION

Figure 1:
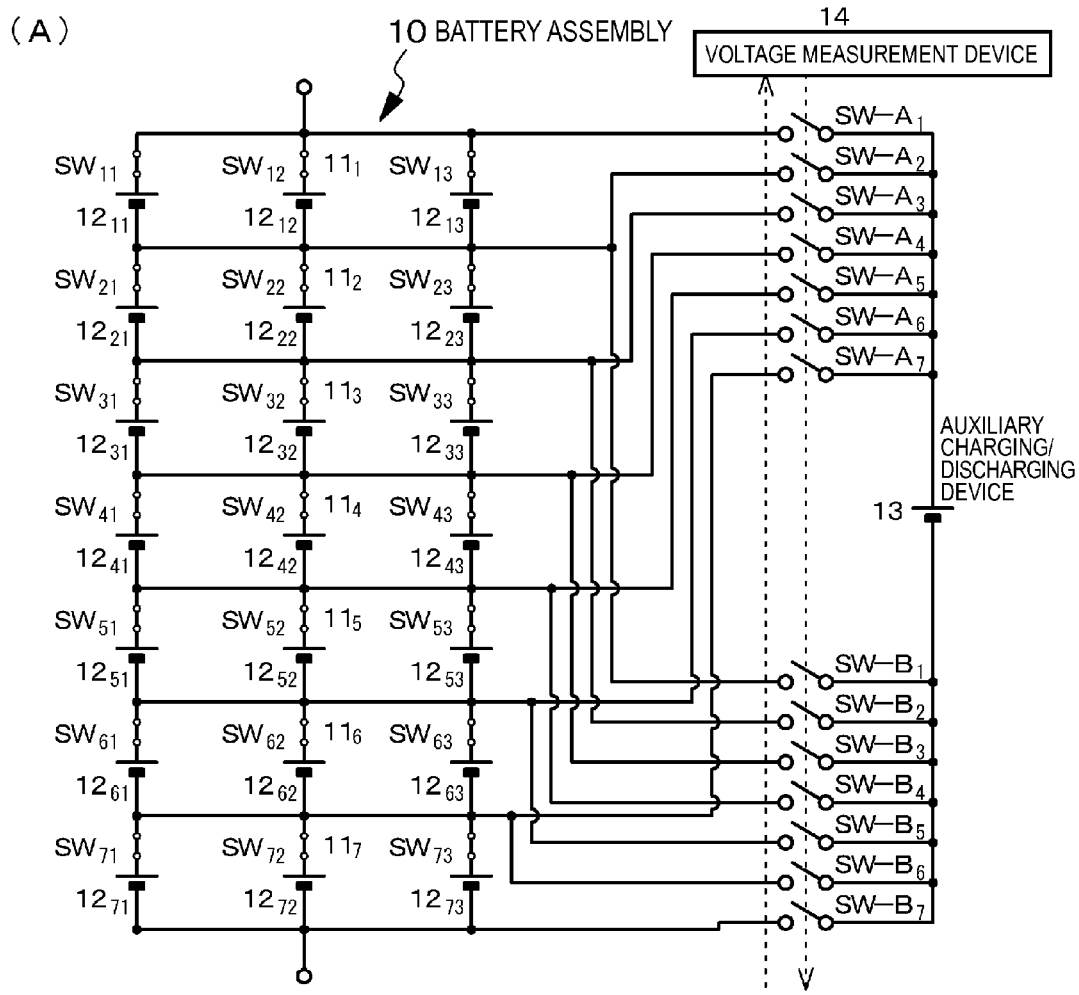
FIGS. 1(A) and 1(B) are a conceptual view of a battery pack of a first embodiment, and a configuration view of the battery pack of the first embodiment, respectively.
Figure 1:
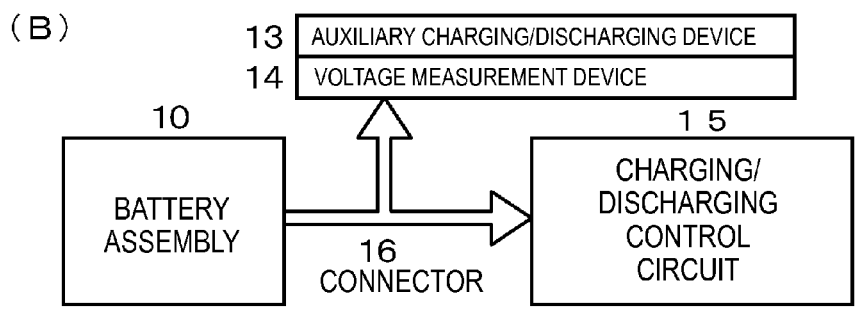
Figure 2:
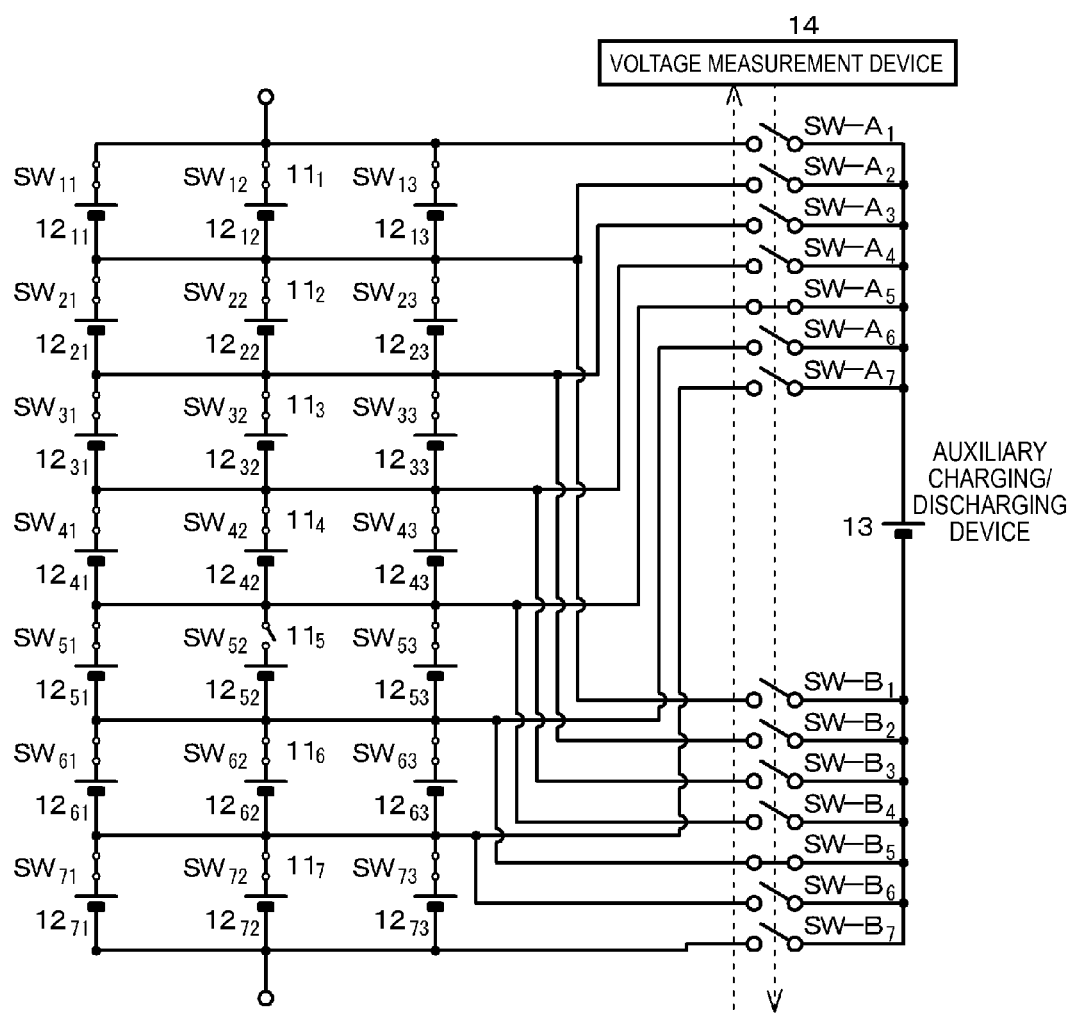
FIG. 2 is a conceptual view when there is an abnormality in a secondary battery cell in the battery pack of the first embodiment.

Hereinafter, a description will be made of the present technology based on embodiments with reference to the drawings. However, the present technology is not limited to the embodiments, and various values and materials used in the embodiment are illustrative. Note that the description will be given in the following order.

1. Overall description of a battery pack according to first to third aspects of the present technology, and a method for charging/discharging the battery pack according to the first and second aspects of the present technology.

2. First embodiment (the battery pack according to the first and third aspects of the present technology, and the method for charging/discharging the battery pack according to the first aspect of the present technology).

3. Second embodiment (the battery pack according to the second aspect of the present technology, and the method for charging/discharging the battery pack according to the second aspect of the present technology), and so forth.

[Overall Description of a Battery Pack According to First to Third Aspects of the Present Technology, and a Method for Charging/Discharging the Battery Pack According to the First and Second Aspects of the Present Technology]

The battery pack according to the first aspect of the present technology may be used in a form in which:

during charging/discharging, when there is no abnormality in secondary battery cells, an auxiliary charging/discharging device is connected in parallel to any one of secondary battery cell parallel modules; and during charging/discharging, when there is an abnormality in any one of the secondary battery cells, the connection to the secondary battery cell at which the abnormality has arisen is released in the secondary battery cell parallel module having the secondary battery cell at which the abnormality has arisen, and the auxiliary charging/discharging device is connected in parallel to the secondary battery cell parallel module having the secondary battery cell at which the abnormality has arisen.

Thus, in the preferred form of the battery pack according to the first aspect of the present technology, during charging, when there is no abnormality in the secondary battery cells, the auxiliary charging/discharging device may be configured to be connected in parallel to the secondary battery cell parallel module having the highest voltage between its both ends. Further, in the preferred form of the battery pack according to the first aspect of the present technology which includes this preferred configuration, during discharging, when there is no abnormality in the secondary battery cells, the auxiliary charging/discharging device may be configured to be connected in parallel to the secondary battery cell parallel module having the lowest voltage between its both ends.

In the method for charging/discharging the battery pack according to the first aspect of the present technology, during charging, when there is no abnormality in the secondary battery cells, the auxiliary charging/discharging device may be configured to be connected in parallel to the secondary battery cell parallel module having the highest voltage between its both ends. Thus, in the method for charging/discharging the battery pack according to the first aspect of the present technology which includes this preferred configuration, during discharging, when there is no abnormality in the secondary battery cells, the auxiliary charging/discharging device may be configured to be connected in parallel to the secondary battery cell parallel module having the lowest voltage between its both ends.

In the battery pack according to the second aspect of the present technology, during charging, when there is no abnormality in the secondary battery cells, the auxiliary charging/discharging device may be configured to be connected in parallel to the secondary battery cell having the highest voltage between its both ends. Thus, in the battery pack according to the second aspect of the present technology which includes this preferred configuration, during discharging, when there is no abnormality in the secondary battery cells, the auxiliary charging/discharging device may be configured to be connected in parallel to the secondary battery cell having the lowest voltage between its both ends.

In the method for charging/discharging the battery pack according to the second aspect of the present technology, during charging, when there is no abnormality in the secondary battery cells, the auxiliary charging/discharging device may be configured to be connected in parallel to the secondary battery cell having the highest voltage between its both ends. Thus, in the method for charging/discharging the battery pack according to the second aspect of the present technology which includes this preferred configuration, during discharging, when there is no abnormality in the secondary battery cells, the auxiliary charging/discharging device may be configured to be connected in parallel to the secondary battery cell having the lowest voltage between its both ends.

In the preferred form of the battery pack according to the first aspect of the present technology which includes the various preferred configurations described above, or in the method for charging/discharging the battery pack according to the first aspect of the present technology which includes the various preferred configurations described above, one end of each secondary battery cell is provided with switching means, and due to an operation of the switching means, the connection to the secondary battery cell at which the abnormality has arisen may be released in the secondary battery cell parallel module having the secondary battery cell at which the abnormality has arisen (in detail, for example, the connection to the secondary battery cell at which the abnormality has arisen is physically released in the secondary battery cell parallel module). In this case, it may be further configured to detect whether or not there is an abnormality in the secondary battery cell by measuring a voltage across the switching means. The control of the switching means may be carried out by a voltage measurement device to be described below, or may provide a switching means control device. Alternatively, it may be configured detect whether or not there is an abnormality in the secondary battery cell by measuring a temperature of the secondary battery cell.

Further, in the preferred form of the battery pack according to the first aspect of the present technology which includes the various preferred configurations described above, or in the method for charging/discharging the battery pack according to the first aspect of the present technology which includes the various preferred configurations described above, it may be configured to provide a voltage measurement device that measures the voltages across the secondary battery cell parallel modules.

In the battery pack according to the second aspect of the present technology which includes the various preferred configurations described above, or in the method for charging/discharging the battery pack according to the second aspect of the present technology which includes the various preferred configurations described above, each secondary battery cell is provided with switching means. Due to an operation of the switching means, opposite ends of the secondary battery cell at which the abnormality has arisen may be configured to be short-circuited. Alternatively, the opposite ends of the secondary battery cell at which the abnormality has arisen may be configured to be short-circuited, and furthermore, the connection between the secondary battery cell at which the abnormality has arisen and a secondary battery cell serial module may be configured to be physically released. In these cases, further, it may be configured to detect whether or not there is an abnormality in the secondary battery cell by measuring the voltage across the switching means. The control of the switching means may be carried out by the voltage measurement device to be described below, or may provide the switching means control device. Alternatively, it may be configured to detect whether or not there is an abnormality in the secondary battery cell by measuring the temperature of the secondary battery cell.

In the preferred form of the battery pack according to the second aspect of the present technology which includes the various preferred configurations described above, or in the method for charging/discharging the battery pack according to the second aspect of the present technology which includes the various preferred configurations described above, an abnormality detection circuit that detects the abnormality of the secondary battery cell may be configured to be installed on the auxiliary charging/discharging device.

Further, in the battery pack according to the second aspect of the present technology which includes the various preferred configurations described above, or in the method for charging/discharging the battery pack according to the second aspect of the present technology which includes the various preferred configurations described above, it may be configured to provide the voltage measurement device that measures the voltages across the secondary battery cells.

Here, an abnormal secondary battery cell refers to, for example, the secondary battery cell in which an internal short-circuit occurs and in which a value of current flowing therethrough is higher than that of a normal secondary battery cell during charging, and a direction of current flowing through the interior thereof is opposite to that of current flowing through the normal secondary battery cell during discharging.

In the battery pack according to the first aspect of the present technology or in the method for charging/discharging the battery pack according to the first aspect of the present technology, the number of auxiliary charging/discharging devices may be one or two or more. Thus, to connect the auxiliary charging/discharging device in parallel to the secondary battery cell parallel module, second switching means may be disposed, for example, between the auxiliary charging/discharging device and the secondary battery cell parallel module, and the auxiliary charging/discharging device and the second switching means, and the secondary battery cell parallel module and the second switching means may be connected by wiring.

In the battery pack according to the second aspect of the present technology or in the method for charging/discharging the battery pack according to the second aspect of the present technology, the number of secondary battery cell serial modules is not limited to one, and may be two or more. In the latter case, a plurality of secondary battery cell serial modules may be connected in parallel. The number of auxiliary charging/discharging devices may be one or two or more. Thus, to connect the auxiliary charging/discharging device in parallel to the secondary battery cell, on/off control means may be disposed, for example, between the auxiliary charging/discharging device and the secondary battery cell, and the auxiliary charging/discharging device and the on/off control means, and the secondary battery cell and the on/off control means may be connected by wiring. When the auxiliary charging/discharging device is connected in series to the secondary battery cell serial module, the auxiliary charging/discharging device may be connected in series to the secondary battery cell serial module via second on/off control means. At which position of the secondary battery cell serial module the auxiliary charging/discharging device is connected in series is essentially arbitrary. For example, a form in which the auxiliary charging/discharging device is connected in series to one end of the secondary battery cell serial module may be exemplified.

The auxiliary charging/discharging device may be the secondary battery cell, specifications of which are the same as or different from those of the secondary battery cell constituting the battery pack. According to circumstances, the auxiliary charging/discharging device may be made up of a condenser (or a capacitor), and a resistor for adjusting internal resistance and the condenser may also be combined. When withstand voltage is not sufficient for the secondary battery cell, a plurality of condensers may be used by serial connection.

A lithium-ion secondary battery may be given as an example of the secondary battery cell. However, not being limited to the lithium-ion secondary battery, a type of the secondary battery to be used may be appropriately selected depending on required characteristics. A configuration and structure of the secondary battery may be a well-known configuration and structure. A shape of the secondary battery may also be a well-known cylindrical or angled shape. The charging/discharging control circuit may be made up of a well-known circuit having a micro processing unit (MPU) or storage means (e.g., made up of an electrically erasable programmable read-only memory (EEPROM)). The voltage measurement device for measuring the voltages across the secondary battery cell parallel modules may also be made up of a well-known circuit. Power supplies of the charging/discharging control circuit and the voltage measurement device may be the secondary battery cell constituting the battery pack. Further, the charging/discharging control circuit may be equipped with a well-known battery protection circuit, and the battery protection circuit may be operated to stop the function of the battery pack as needed. As the switching means, the second switching means, the on/off control means, the second on/off control means, or the third on/off control means to be described below, for example, a metal oxide semiconductor field effect transistor (MOSFET), may be exemplified. As a connecting part that connects the battery assembly and the charging/discharging control circuit, for example, a connector having a tap portion may be exemplified. According to circumstances, the voltage measurement device may be included in the charging/discharging control circuit.

In the present technology, the battery pack may be applied, for example, to various power consumption devices such as electric automobiles (including hybrid cars), golf carts, electric carts, electric motorcycles, electric power-assisted bicycles, railroad vehicles, electric tools such as electric drills, power supply units or home energy servers (household electric storage devices), personal computers, mobile phones, personal digital assistants (PDAs), digital still cameras or video cameras, camcorders, electronic books, electronic dictionaries, music players, radios, headphones, cordless telephone extension units, electric shavers, refrigerators, air conditioners, television receivers or graphic display devices, monitors, stereophonic devices, water heaters, microwave ovens, dishwashers, washing machines, driers, lighting instruments such as interior lamps, game consoles, navigation systems, memory cards, pacemakers, hearing aids, medical instruments, toys, robots, load conditioners, and traffic lights, and may be a driving power supply or an assisting power supply for these power consumption devices. That is, the power consumption device of the present technology has the battery pack according to the first to third aspect of the present technology which includes the various preferred forms and configurations described above. Alternatively, the battery pack in the present technology may be applied, for instance, to instruments such as power storage power supplies for buildings including houses or power-generating facilities, may be used to supply power to these instruments, and may be used as an electric storage device in a so-called smart grid. This electric storage device may not only supply power but may also store electricity by supply of power from another power source. Furthermore, the battery pack in the present technology may be incorporated into home energy management systems (HEMSs) and building energy management systems (BEMSs). Further, as the power supply for charging the secondary battery cell constituting the battery pack, in addition to commercial power supplies, various solar batteries, fuel batteries, thermal power generating facilities, nuclear power generating facilities, water power generating facilities, wind power generating facilities, micro water power generating facilities, and geothermal power generating facilities may be exemplified. Regenerated energy which the power consumption device produces may also be exemplified. However, the power supply is not limited to these.

[First Embodiment]

The first embodiment relates to the battery pack according to the first to third aspects of the present technology and the method for charging/discharging the same. A conceptual view of the battery pack of the first embodiment is shown in FIG. 1(A), and a configuration view of the battery pack of the first embodiment is shown in FIG. 1(B).

The battery pack of the first embodiment includes a battery assembly 10 in which a plurality of secondary battery cell parallel modules 11 (in the example shown in the drawings, seven secondary battery cell parallel modules $11_1$, $11_2$, $11_3$, $11_4$, $11_5$, $11_6$, and $11_7$) made up of a plurality of secondary battery cells 12 (in the example shown in the drawings, 21 secondary battery cells $12_{11}$, $12_{12}$, $12_{13}$, $12_{21}$, $12_{22}$, $12_{23}$, $12_{31}$, $12_{32}$, $12_{33}$, $12_{41}$, $12_{42}$, $12_{43}$, $12_{51}$, $12_{52}$, $12_{53}$, $12_{61}$, $12_{62}$, $12_{63}$, $12_{71}$, $12_{72}$, and $12_{73}$) connected in parallel are connected in series, and an auxiliary charging/discharging device 13. Thus, the auxiliary charging/discharging device 13 is basically connected in parallel to any of the secondary battery cell parallel modules 11. Furthermore, the battery pack of the first embodiment has a voltage measurement device 14 that measures voltages across the secondary battery cell parallel modules 11. The secondary battery cell 12 is made up of, but not limited to, a lithium-ion secondary battery.

Further, as shown in FIG. 1(B), the battery pack of the first embodiment includes a battery assembly 10 in which a plurality of secondary battery cell parallel modules 11, each of which is made up of a plurality of secondary battery cells 12 connected in parallel, are connected in series, a charging/discharging control circuit 15 connected to the battery assembly 10 via a connecting part (particularly, a connector 16 having a tap portion), and a voltage measurement device 14 and an auxiliary charging/discharging device 13 tapped from the connecting part (particularly, the connector 16 having the tap portion) and connected to the battery assembly 10, wherein the voltage measurement device 14 measures voltages across the secondary battery cell parallel modules 11.

Here, the charging/discharging control circuit 15 is made up of a well-known circuit having an MPU or storage means (e.g., made up of an EEPROM). The voltage measurement device 14, which measures the voltages across the secondary battery cell parallel modules 11, is also made up of a well-known circuit. A power supply of each of the charging/discharging control circuit 15 and the voltage measurement device 14 is the secondary battery cell 12 constituting the battery pack. Further, the charging/discharging control circuit 15 is equipped with a well-known battery protection circuit (not shown). The battery protection circuit is operated to stop a function of the battery pack as needed.

In the battery pack of the first embodiment, the number of auxiliary charging/discharging devices 13 is one, although not limited thereto. The auxiliary charging/discharging device 13 is made up of the secondary battery cell, specifications of which are the same as those of the secondary battery cell 12 constituting the battery assembly 10. To connect the auxiliary charging/discharging device 13 in parallel to the secondary battery cell parallel modules, second switching means SW-A and SW-B (in detail, seven sets of second switching means SW-$A_1$, SW-$B_1$, SW-$A_2$, SW-$B_2$, SW-$A_3$, SW-$B_3$, SW-$A_4$, SW-$B_4$, SW-$A_5$, SW-$B_5$, SW-$A_6$, SW-$B_6$, SW-$A_7$, and SW-$B_7$) are disposed between the auxiliary charging/discharging device 13 and the secondary battery cell parallel module 11. Thus, the auxiliary charging/discharging device 13 and the second switching means SW-A and SW-B, and the secondary battery cell parallel modules 11 and the second switching means SW-A and SW-B are connected by wiring. In the first embodiment, the conduction/nonconduction of the second switching means SW-A and SW-B is controlled by the voltage measurement device 14, although not limited thereto.

In the battery pack of the first embodiment, one ends of the secondary battery cells 12 are provided with switching means SW (switching means $SW_{11}$, $SW_{12}$, $SW_{13}$, $SW_{21}$, $SW_{22}$, $SW_{23}$, $SW_{31}$, $SW_{32}$, $SW_{33}$, $SW_{41}$, $SW_{42}$, $SW_{43}$, $SW_{51}$, $SW_{52}$, $SW_{53}$, $SW_{61}$, $SW_{62}$, $SW_{63}$, $SW_{71}$, $SW_{72}$, and $SW_{73}$). Thus, due to an operation of the switching means, the connection to the secondary battery cell 12 at which the abnormality has arisen is released in the secondary battery cell parallel module 11 including the secondary battery cell 12 at which the abnormality has arisen. In detail, the switching means SW is set to a nonconduction state, and thereby the connection to the secondary battery cell 12 at which the abnormality has arisen in the secondary battery cell parallel module 11 is physically released. The control of the switching means SW is carried out by the voltage measurement device 14, although not limited thereto. The switching means SW and the voltage measurement device 14 are connected by wiring (not shown). However, not being limited to this, the switching means SW and the voltage measurement device 14 may be connected without a wire.

Figure 7:
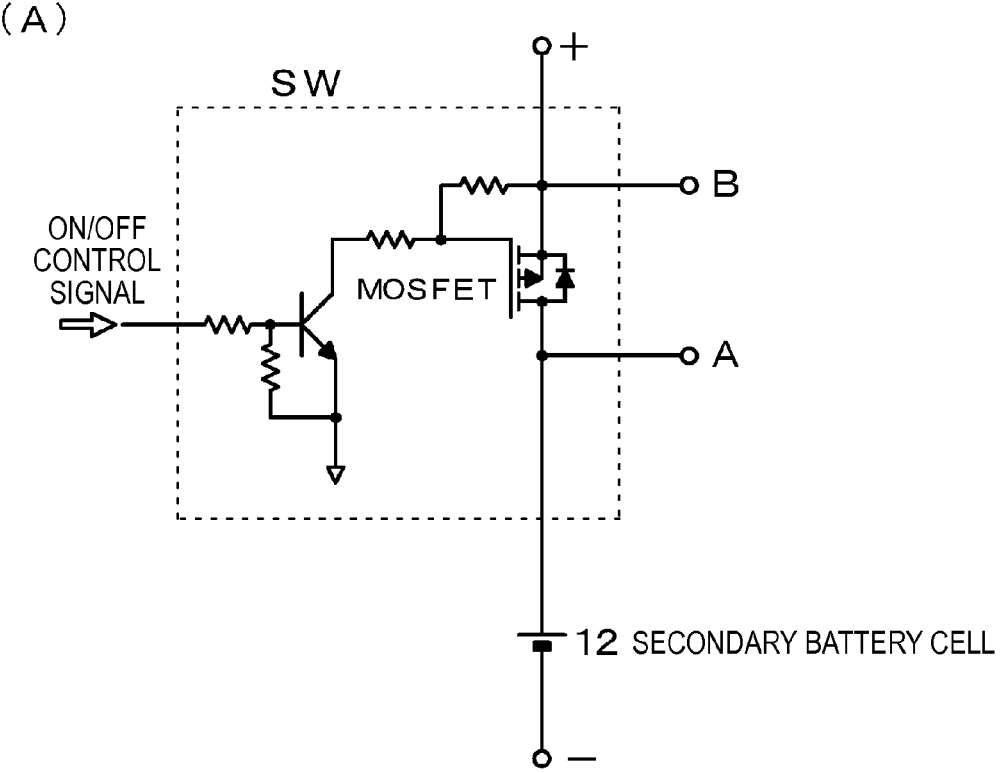
FIGS. 7(A), 7(B) and 7(C) are an equivalent circuit diagram of switching means, a conceptual view for describing a flow of current during charging, and a conceptual view for describing a flow of current during discharging, respectively.
Figure 7:
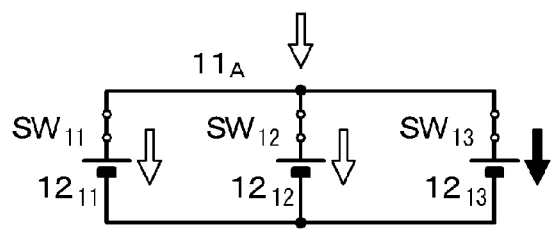
Figure 7:
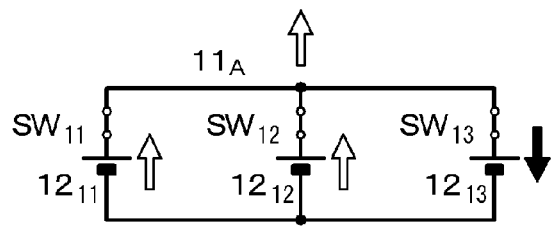

Here, by measuring a voltage across the switching means SW, it is detected whether or not the abnormality has arisen in the secondary battery cell 12. For example, as shown in FIG. 7(A), the switching means SW is made up of a p-channel MOSFET. In the abnormal secondary battery cell, for example, an internal short-circuit occurs. For this reason, as shown in FIG. 7(C), during discharging, a direction of current flowing along an interior is opposite to that of current flowing along an interior of the normal secondary battery cell. As such, by measuring the direction of current flowing along the switching means SW, it can be checked whether an abnormality has arisen in the secondary battery cell. Further, in the abnormal secondary battery cell, as shown in FIG. 7(B), during charging, a value of the flowing current is higher than that of the normal secondary battery cell. As such, by measuring a potential across the switching means SW, i.e. by measuring a value of ON resistance of the MOSFET, it can be checked whether an abnormality has arisen in the secondary battery cell. The ON resistance of the MOSFET varies to some extent due to current and temperature, but may be sufficiently used if a direction of the current or a great difference in an amount of the current is merely measured. That is, under the control of the voltage measurement device 14, an ON/OFF control signal is sent to the switching means SW, and the switching means SW is placed in an ON state (conduction state). A potential between opposite ends of the MOSFET (terminal "A" and terminal "B") is measured, or a flowing direction of current at the opposite ends of the MOSFET is measured. Thereby, it can be checked whether an abnormality has arisen in the secondary battery cell 12. In FIGS. 7(B) and 7(C), the current flowing along the normal secondary battery cell is depicted by an outlined arrow, and the current flowing along the abnormal secondary battery cell is depicted by a black arrow.

Thus, in the battery pack of the first embodiment, during charging/discharging, when there is no abnormality in the secondary battery cells 12, the auxiliary charging/discharging device 13 is connected in parallel to any secondary battery cell parallel module 11. On the other hand, during charging/discharging, when there is an abnormality in any secondary battery cell, the connection to the secondary battery cell at which the abnormality has arisen is released in the secondary battery cell parallel module including the secondary battery cell at which the abnormality has arisen, and the auxiliary charging/discharging device 13 is connected in parallel to the secondary battery cell parallel module including the secondary battery cell at which the abnormality has arisen. Furthermore, during charging, when there is no abnormality in the secondary battery cells, the auxiliary charging/discharging device 13 is connected in parallel to the secondary battery cell parallel module having the highest voltage between its both ends. Further, during discharging, when there is no abnormality in the secondary battery cells, the auxiliary charging/discharging device 13 is connected in parallel to the secondary battery cell parallel module having the lowest voltage between its both ends.

Figure 14:
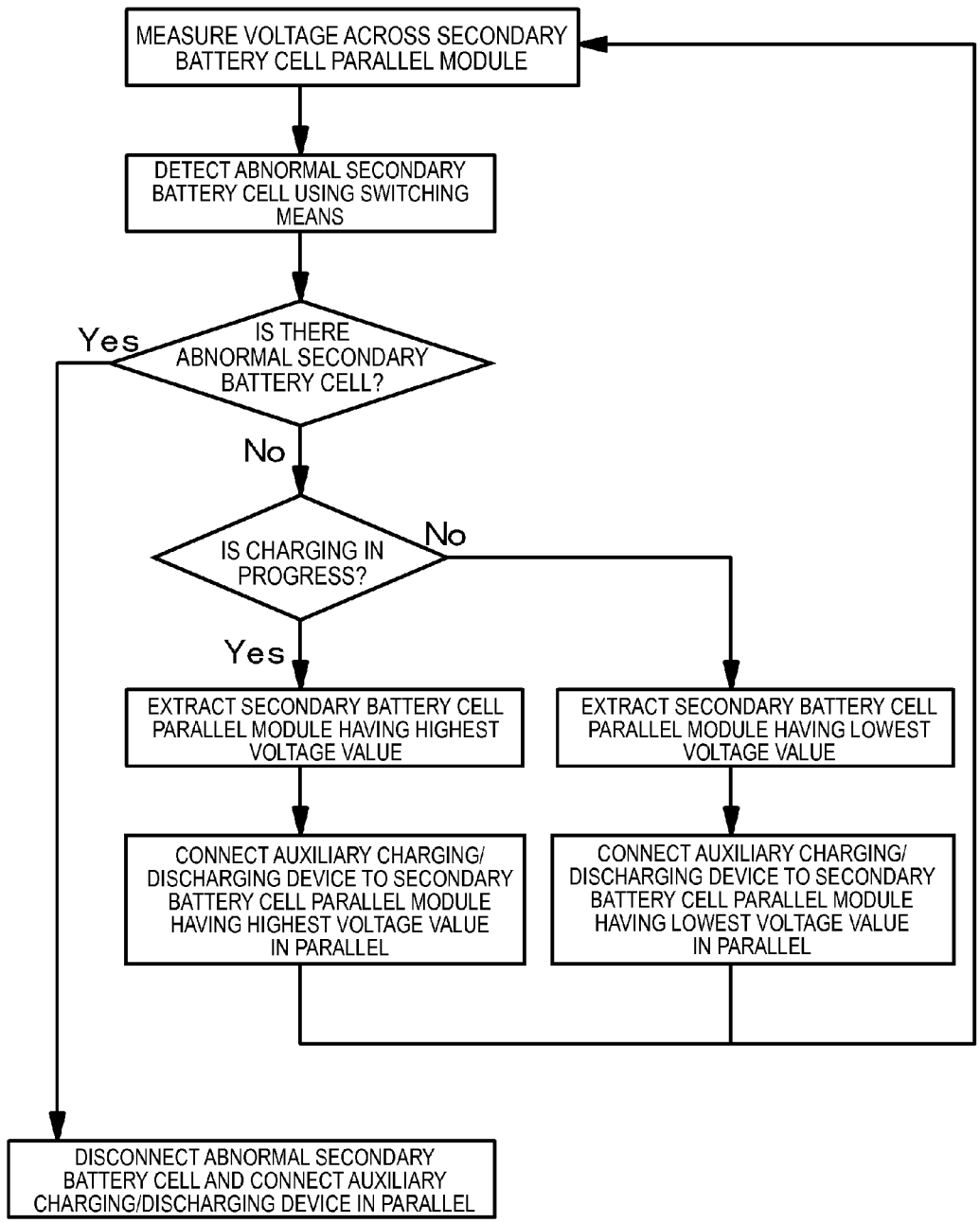
FIG. 14 is a flow chart of a method for charging/discharging the battery pack of the first embodiment.
Figure 15:
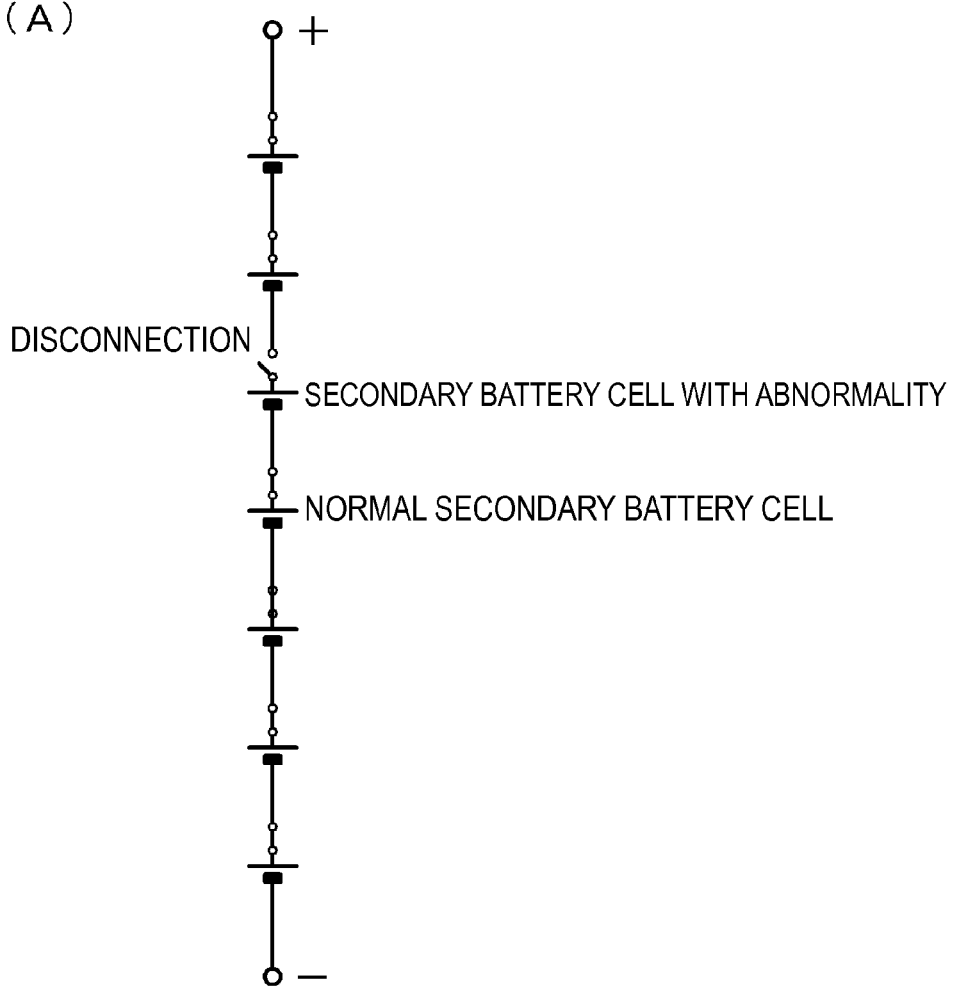
FIGS. 15(A) and 15(B) are conceptual views for describing a problem when there is an abnormality in a secondary battery cell in a conventional battery pack.
Figure 15:
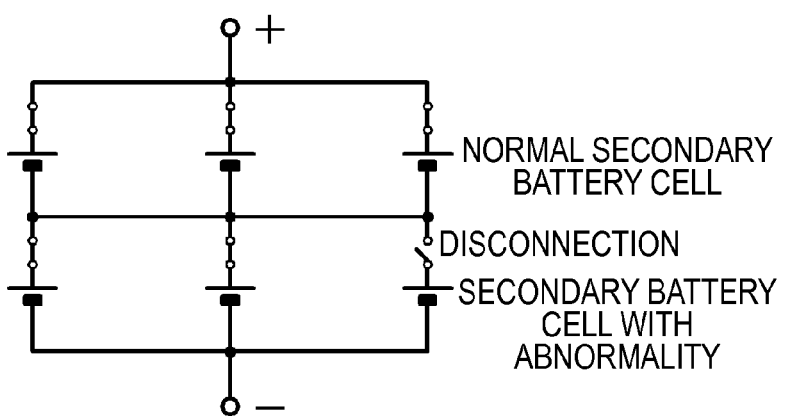

Hereinafter, the method for charging/discharging the battery pack of the first embodiment will be described with reference to FIGS. 2 to 6 that are conceptual views of the battery pack and FIG. 14 that is a flow chart.

In the method for charging/discharging the secondary battery cells of the first embodiment, during charging/discharging, when there is no abnormality in the secondary battery cells, the auxiliary charging/discharging device 13 is connected in parallel to any secondary battery cell parallel module 11. In detail, during charging, when there is no abnormality in the secondary battery cells, the auxiliary charging/discharging device 13 is connected in parallel to the secondary battery cell parallel module 11 having the highest voltage between its both ends. During charging, the voltages across the secondary battery cell parallel modules 11 are measured by the voltage measurement device 14 at all times, and a state of charge of the secondary battery cell parallel module 11 is monitored at all times. Thus, the voltage measurement device 14 evaluates a result of measuring the voltages across the secondary battery cell parallel modules 11 at desired intervals of time.

Figure 3:
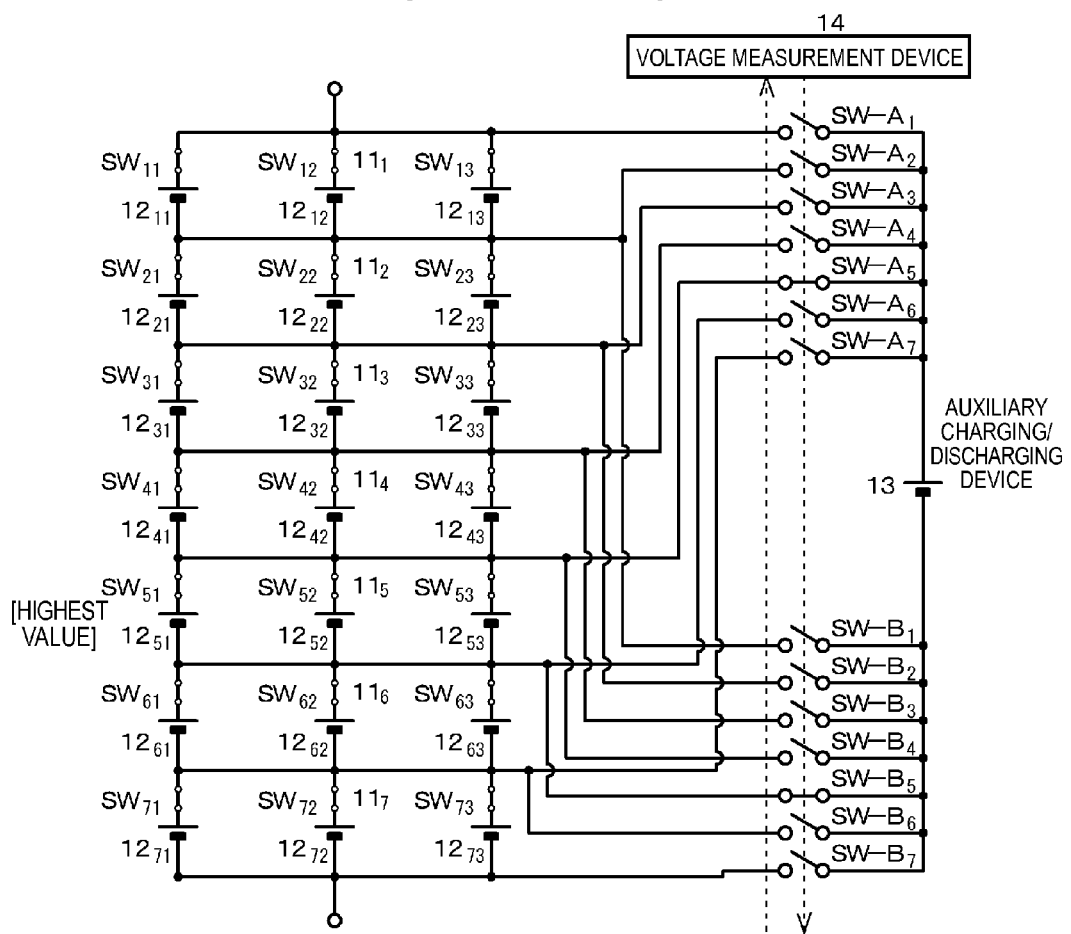
FIG. 3 is a conceptual view of the battery pack of the first embodiment during charging.

For example, as shown in FIG. 3, when the voltage across the secondary battery cell parallel module $11_5$ is a highest value, the second switching means SW-A5 and SW-$B_5$ switch to a conduction state under the control of the voltage measurement device 14, and the other second switching means SW-A and SW-B are placed in a nonconduction state. As a result, the auxiliary charging/discharging device 13 is connected in parallel to the secondary battery cell parallel module $11_5$. Thus, the auxiliary charging/discharging device 13 is connected in parallel, and thereby a charging speed in the secondary battery cell parallel module $11_5$ in which the voltage between its both ends is the highest value becomes slow. As a result, the uniformity of the nature and the voltage across the secondary battery cell parallel module can be achieved, and the equilibrium of cell balance can be achieved. The charge of the auxiliary charging/discharging device 13 made up of the secondary battery cell can be performed. In addition, the state of charge (SOC) of the auxiliary charging/discharging device 13 made up of the secondary battery cell can be maintained to the same extent as the secondary battery cell. The abnormal secondary battery cell can be replaced at any time, and can be exchanged and used smoothly.

Figure 4:
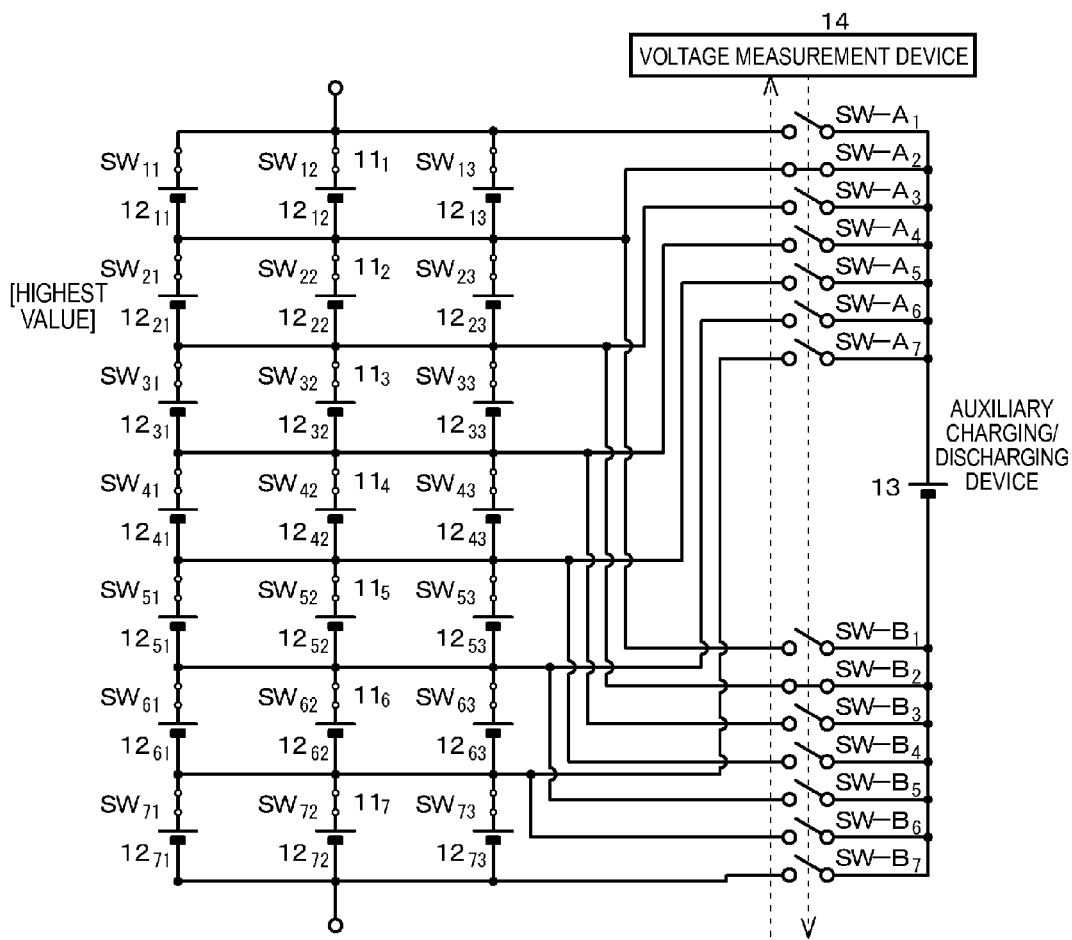
FIG. 4 is a conceptual view of the battery pack of the first embodiment during charging.

As the charge of the battery pack progresses, the secondary battery cell parallel module in which the voltage between its both ends is the highest value is also changed. Accordingly, the voltage measurement device 14 evaluates the result of measuring the voltages across the secondary battery cell parallel modules 11 at desired intervals of time. As shown in FIG. 4, when the voltage across the secondary battery cell parallel module $11_2$ reaches a highest value, the second switching means SW-$A_2$ and SW-$B_2$ switch to a conduction state under the control of the voltage measurement device 14, and the other second switching means SW-A and SW-B are placed in a nonconduction state. As a result, the auxiliary charging/discharging device 13 is connected in parallel to the secondary battery cell parallel module $11_2$. This operation is sequentially repeated to complete the charge of the battery pack.

Figure 5:
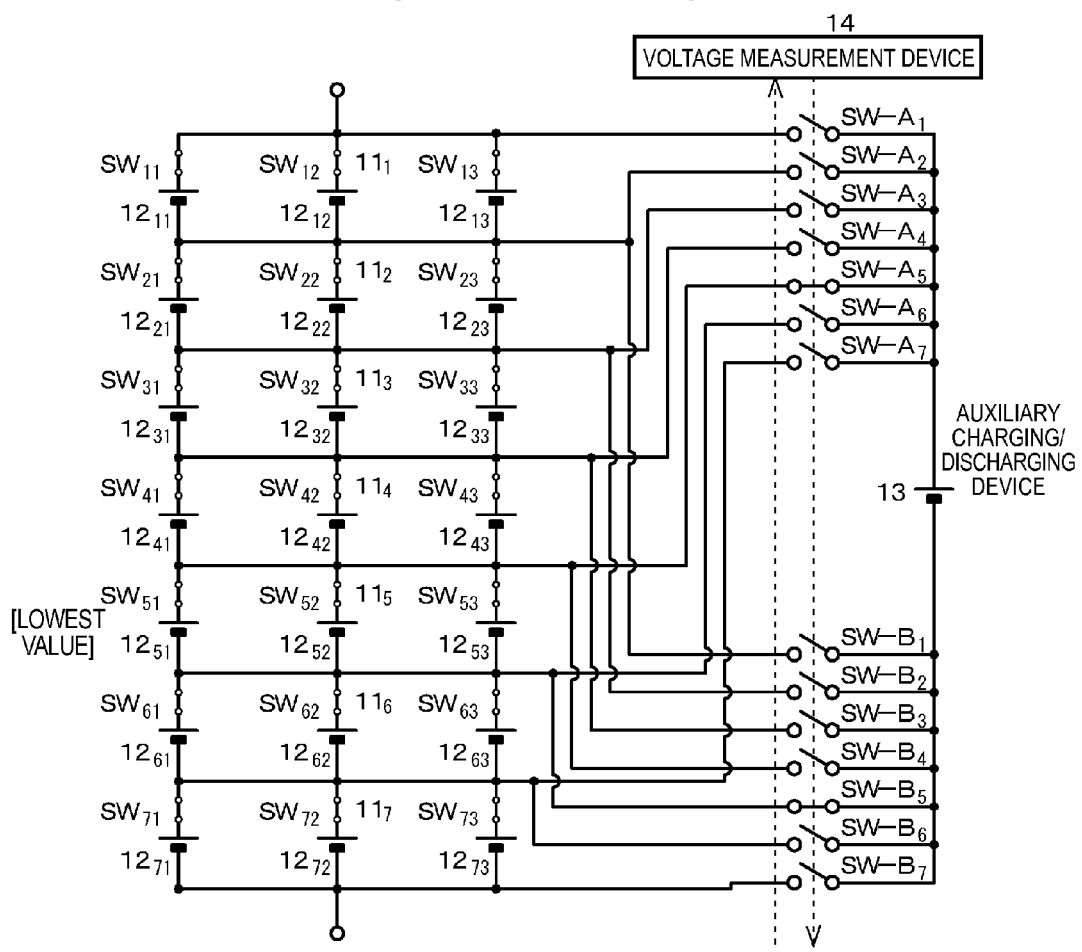
FIG. 5 is a conceptual view of the battery pack of the first embodiment during discharging.

On the other hand, during discharging, when there is no abnormality in the secondary battery cells, the auxiliary charging/discharging device 13 is connected in parallel to the secondary battery cell parallel module having the lowest voltage between its both ends. For example, as shown in FIG. 5, when the voltage across the secondary battery cell parallel module $11_5$ is the lowest value, the second switching means SW-$A_5$ and SW-$B_5$ switch to the conduction state under the control of the voltage measurement device 14, and the other second switching means SW-A and SW-B are placed in the nonconduction state. As a result, the auxiliary charging/discharging device 13 is connected in parallel to the secondary battery cell parallel module $11_5$. Thus, the auxiliary charging/discharging device 13 is connected in parallel, and thereby a discharging speed in the secondary battery cell parallel module $11_5$ in which the voltage between its both ends is the lowest value becomes slow. As a result, the uniformity of the nature and the voltage across the secondary battery cell parallel module can be achieved, and the equilibrium of cell balance can be achieved. The auxiliary charging/discharging device 13 made up of the secondary battery cell contributes to the discharge. That is, the auxiliary charging/discharging device 13 operates as additional capacity in the secondary battery cell parallel module.

Figure 6:
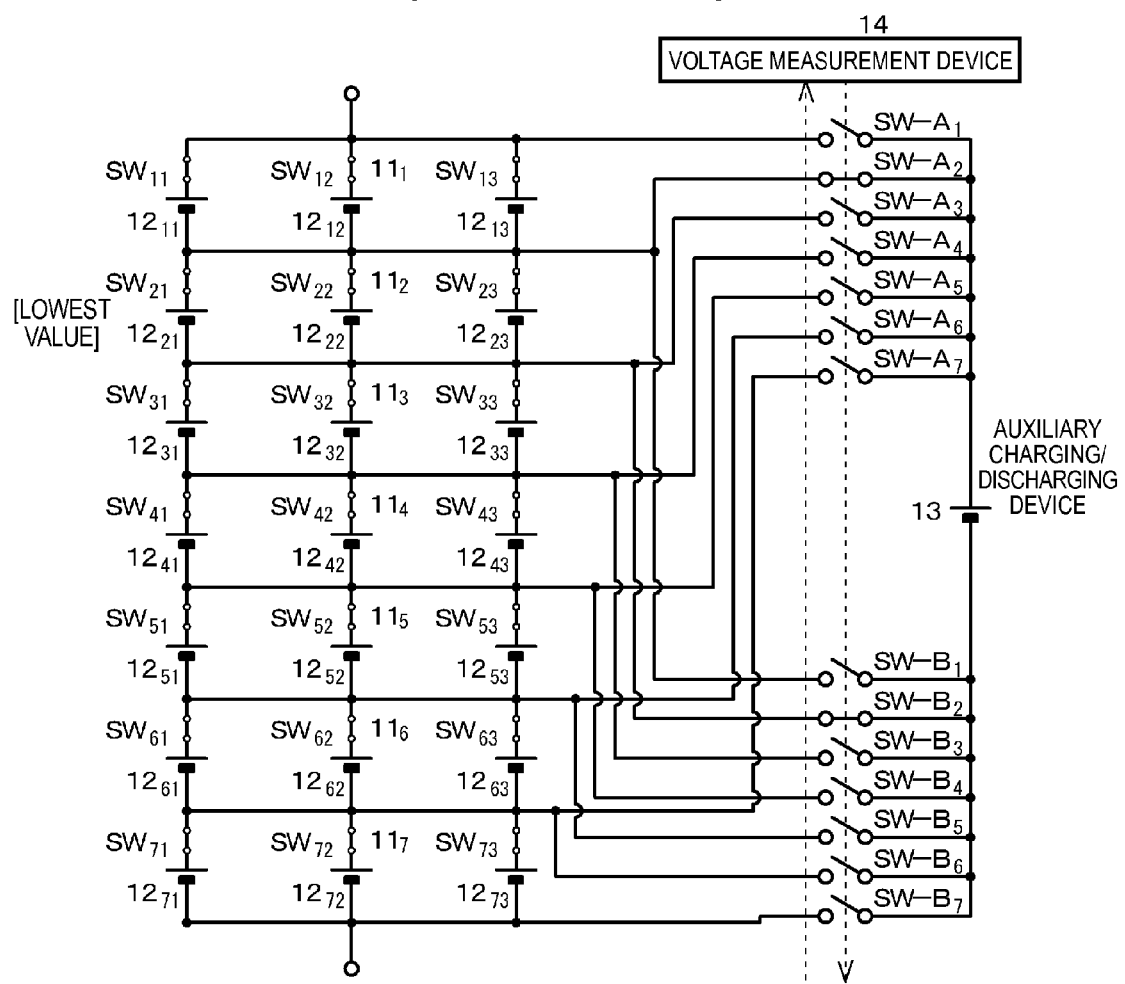
FIG. 6 is a conceptual view of the battery pack of the first embodiment during discharging.

As the discharge of the battery pack progresses, the secondary battery cell parallel module in which the voltage between its both ends is the lowest value is also changed. Accordingly, the voltage measurement device 14 evaluates the result of measuring the voltages across the secondary battery cell parallel modules 11 at desired intervals of time. As shown in FIG. 6, when the voltage across the secondary battery cell parallel module $11_2$ reaches a lowest value, the second switching means SW-$A_2$ and SW-$B_2$ switch to a conduction state under the control of the voltage measurement device 14, and the other second switching means SW-A and SW-B are placed in a nonconduction state. As a result, the auxiliary charging/discharging device 13 is connected in parallel to the secondary battery cell parallel module $11_2$. This operation is sequentially repeated to complete the discharge of the battery pack.

During charging/discharging, when it is detected by the switching means SW that an abnormality has arisen at any secondary battery cell (in the example shown in FIG. 2, when there is an abnormality in the secondary battery cell $12_{52}$), the connection to the secondary battery cell $12_{52}$ at which the abnormality has arisen is released in the secondary battery cell parallel module $11_5$ including the secondary battery cell $12_{52}$ at which the abnormality has arisen. In detail, the switching means $SW_{52}$ is set to a nonconduction state, and thereby the connection to the secondary battery cell $12_{52}$ at which the abnormality has arisen in the secondary battery cell parallel module $11_5$ is physically released. Thus, the auxiliary charging/discharging device 13 is connected in parallel to the secondary battery cell parallel module $11_5$ including the secondary battery cell $12_{52}$ at which the abnormality has arisen. In detail, under the control of the voltage measurement device 14, the second switching means SW-$A_5$ and SW-$B_5$ switch to the conduction state, and the other second switching means SW-A and SW-B are placed in the nonconduction state. As a result, the auxiliary charging/discharging device 13 is connected in parallel to the secondary battery cell parallel module $11_5$. Thus, an operation of the secondary battery cell parallel module $11_5$ exerts a charging/discharging function that is equivalent to that before the abnormality arose at the secondary battery cell.

Then, in this state, without carrying out the method for charging/discharging the battery pack of the first embodiment, the charge/discharge in the conventional battery pack is performed. In this way, when there is an abnormal secondary battery cell, it is preferable to give a sign of warning that the exchange or maintenance of the secondary battery cell is required, and to call a user's attention. Further, when a plurality of auxiliary charging/discharging devices 13 are provided, the method for charging/discharging the battery pack of the first embodiment may also be carried out in this state.

In this way, in the battery pack of the first embodiment or in the method for charging/discharging the same, during charging/discharging, when there is no abnormality in the secondary battery cells, the auxiliary charging/discharging device is connected in parallel to any secondary battery cell parallel module. As such, during charging/discharging the secondary battery cell, the auxiliary charging/discharging device can also contribute to the charge/discharge, and the optimization of the cell balance in charging/discharging the entire battery pack in which the plurality of secondary battery cells are connected can be achieved. Charging/discharging of the entire battery pack can be made more efficient. Furthermore, during charging/discharging, when there is an abnormality in any secondary battery cell, the connection to the secondary battery cell at which the abnormality has arisen is released in the secondary battery cell parallel module including the secondary battery cell at which the abnormality has arisen, and the auxiliary charging/discharging device is connected in parallel to the secondary battery cell parallel module including the secondary battery cell at which the abnormality has arisen. As such, the battery pack can be used without interruption, and the auxiliary charging/discharging device can function as a protection device having redundancy. A greater burden can be prevented from being imposed on the secondary battery cells constituting the secondary battery cell parallel module, and the secondary battery cell parallel module can be maintained in the same use state as before the abnormality arose at the secondary battery cell.

As the method of detecting the abnormal secondary battery cell, in addition to the method of using the above-mentioned switching means, a method of instantly setting the switching means to the nonconduction state in one of the secondary battery cells, setting the switching means to the conduction state in all the remaining secondary battery cells, and checking a state of variation in an open circuit voltage (OCV) of the secondary battery cell for which the switching means is set to the nonconduction state based on, for instance, the voltage measurement device 14 may be employed. When there is an abnormality in the secondary battery cell, the variation of the open circuit voltage (OCV) is greater than that of the normal secondary battery cell. Thus, by performing this operation on all the secondary battery cells, the secondary battery cell at which the abnormality has arisen can be detected.

Alternatively, for example, a method of attaching an integrated circuit (IC) chip, which has temperature detecting means (e.g., temperature detecting means that has a pn junction and measures temperature based on temperature dependency of an electric resistance value of the pn junction), to an outer surface of the secondary battery cell, and sending the temperature information measured by the IC chip to, for instance, the voltage measurement device 14 with or without a wire may be employed. In the abnormal secondary battery cell at which the internal short-circuit occurs, the generation of heat is high. For this reason, based on a result of measuring the temperature of the secondary battery cell, it is possible to detect whether or not the abnormality of the secondary battery cell has arisen. When the switching means SW and the voltage measurement device 14 are connected without a wire, the IC chip may intervene for the control of the switching means SW caused by the voltage measurement device 14.

[Second Embodiment]

Figure 8:
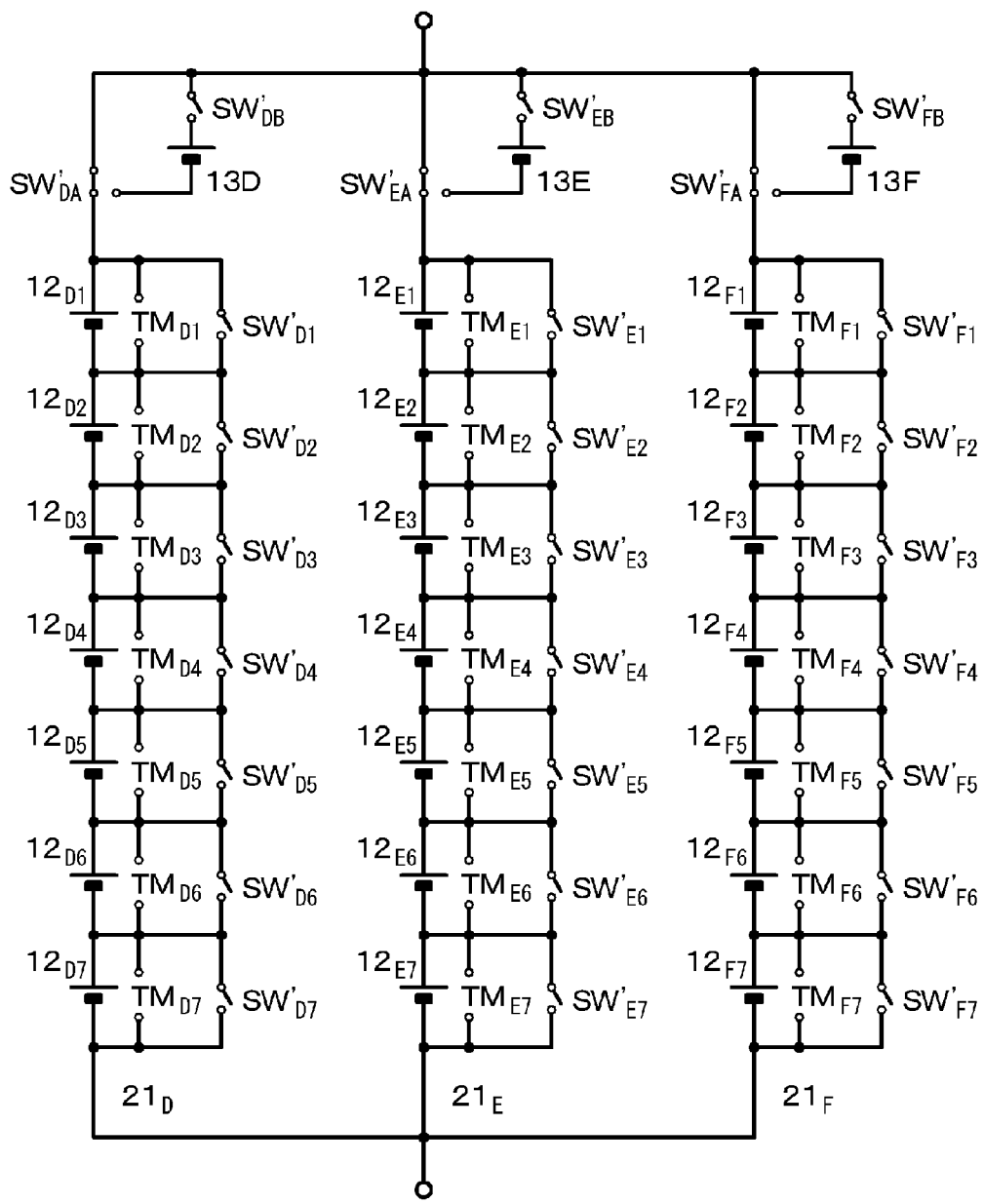
FIG. 8 is a conceptual view of a battery pack of a second embodiment

The second embodiment relates to the battery pack according to the second aspect of the present technology and the method for charging/discharging the same. A conceptual view of the battery pack of the second embodiment is shown in FIG. 8.

The battery pack of the second embodiment includes secondary battery cell serial modules, each of which is made up of a plurality of secondary battery cells connected in series, and an auxiliary charging/discharging device 13. In detail, in the second embodiment, one secondary battery cell serial module $21_D$ is made up of seven secondary battery cells 12 ($12_{D1}$, $12_{D2}$, $12_{D3}$, $12_{D4}$, $12_{D5}$, $12_{D6}$, and $12_{D7}$) connected in series. Similarly, one secondary battery cell serial module $21_E$ is made up of seven secondary battery cells 12 ($12_{E1}$, $12_{E2}$, $12_{E3}$, $12_{E4}$, $12_{E5}$, $12_{E6}$, and $12_{E7}$) connected in series. Further, similarly, one secondary battery cell serial module $21_F$ is made up of seven secondary battery cells 12 ($12_{F1}$, $12_{F2}$, $12_{F3}$, $12_{F4}$, $12_{F5}$, $12_{F6}$, and $12_{F7}$) connected in series. Thus, the three secondary battery cell serial modules $21_D$, $21_E$, and $21_F$ are connected in parallel. Furthermore, the battery pack of the second embodiment includes a voltage measurement device (not shown in FIG. 8), which measures voltages across the secondary battery cells 12. The secondary battery cell 12 is made up of a lithium-ion secondary battery, although not limited thereto.

Further, like that shown in FIG. 1(B), the battery pack of the second embodiment includes a battery assembly 10 made up of secondary battery cell serial modules 21 which are each made up of a plurality of secondary battery cells 12 and which are connected in parallel, a charging/discharging control circuit 15 connected to the battery assembly 10 via a connecting part (particularly, a connector 16 having a tap portion), and a voltage measurement device 14 and an auxiliary charging/discharging device 13 tapped from the connecting part (particularly, the connector 16 having the tap portion) and connected to the battery assembly 10, wherein the voltage measurement device 14 measures voltages across the secondary battery cells 12. Here, the charging/discharging control circuit 15 and the voltage measurement device 14 may have a configuration and structure similar to the charging/discharging control circuit 15 and the voltage measurement device 14, both of which were described in the first embodiment.

Even in the battery pack of the second embodiment, the number of auxiliary charging/discharging devices 13 is one, although not limited thereto. The auxiliary charging/discharging device 13 is made up of the secondary battery cell, specifications of which are the same as those of the secondary battery cell 12 constituting the battery assembly 10. To connect the auxiliary charging/discharging device 13 in parallel to the secondary battery cells 12, terminal parts TM (terminal parts $TM_{D1}$, $TM_{D2}$, $TM_{D3}$, $TM_{D4}$, $TM_{D5}$, $TM_{D6}$, $TM_{D7}$, $TM_{E1}$, $TM_{E2}$, $TM_{E3}$, $TM_{E4}$, $TM_{E5}$, $TM_{E6}$, $TM_{E7}$, $TM_{F1}$, $TM_{F2}$, $TM_{F3}$, $TM_{F4}$, $TM_{F5}$, $TM_{F6}$, and $TM_{F7}$) are installed on opposite ends of the secondary battery cells 12. The auxiliary charging/discharging device 13 is connected in parallel to the secondary battery cells 12 via the terminal parts TM and the on/off control means (not shown). The control of the on/off control means is performed by the voltage measurement device 14, although not limited thereto.

Further, second on/off control means SW' (second on/off control means $SW'_{D1}$, $SW'_{D2}$, $SW'_{D3}$, $SW'_{D4}$, $SW'_{D5}$, $SW'_{D6}$, $SW'_{D7}$, $SW'_{E1}$, $SW'_{E2}$, $SW'_{E3}$, $SW'_{E4}$, $SW'_{E5}$, $SW'_{E6}$, $SW'_{E7}$, $SW'_{F1}$, $SW'_{F2}$, $SW'_{F3}$, $SW'_{F4}$, $SW'_{F5}$, $SW'_{F6}$, and $SW'_{F7}$) are installed on the respective secondary battery cell 12. Due to an operation of the second on/off control means SW', the opposite ends of the secondary battery cell at which the abnormality has arisen are short-circuited. The control of the second on/off control means SW' is performed by the voltage measurement device 14, although not limited thereto. The second on/off control means SW' and the voltage measurement device 14 are connected by wiring. However, not being limited to this, the second on/off control means SW' and the voltage measurement device 14 may be connected without a wire.

Thus, in the battery pack of the second embodiment, during charging/discharging, when there is no abnormality in the secondary battery cells 12, the auxiliary charging/discharging device 13 is connected in parallel to any secondary battery cell 12. On the other hand, during charging/discharging, when there is an abnormality in any secondary battery cell, the secondary battery cell at which the abnormality has arisen is disconnected from the secondary battery cell serial module 21, and the auxiliary charging/discharging device 13 is connected in series to the secondary battery cell serial module 21. Under the control of the voltage measurement device 14, the auxiliary charging/discharging device 13 is connected in series to the secondary battery cell serial module 21 by an operation of third on/off control means $SW'_{DA}$, $SW'_{DB}$, $SW'_{EA}$, $SW'_{EB}$, $SW'_{FA}$, and $SW'_{FB}$. Furthermore, during charging, when there is no abnormality in the secondary battery cells, the auxiliary charging/discharging device 13 is connected in parallel to the secondary battery cell having the highest voltage between its both ends. Further, during discharging, when there is no abnormality in the secondary battery cells, the auxiliary charging/discharging device 13 is connected in parallel to the secondary battery cell having the lowest voltage between its both ends. Similar to the first embodiment, the on/off control means, the second on/off control means, and the third on/off control means may be made up of, for example, a MOSFET.

Figure 9:
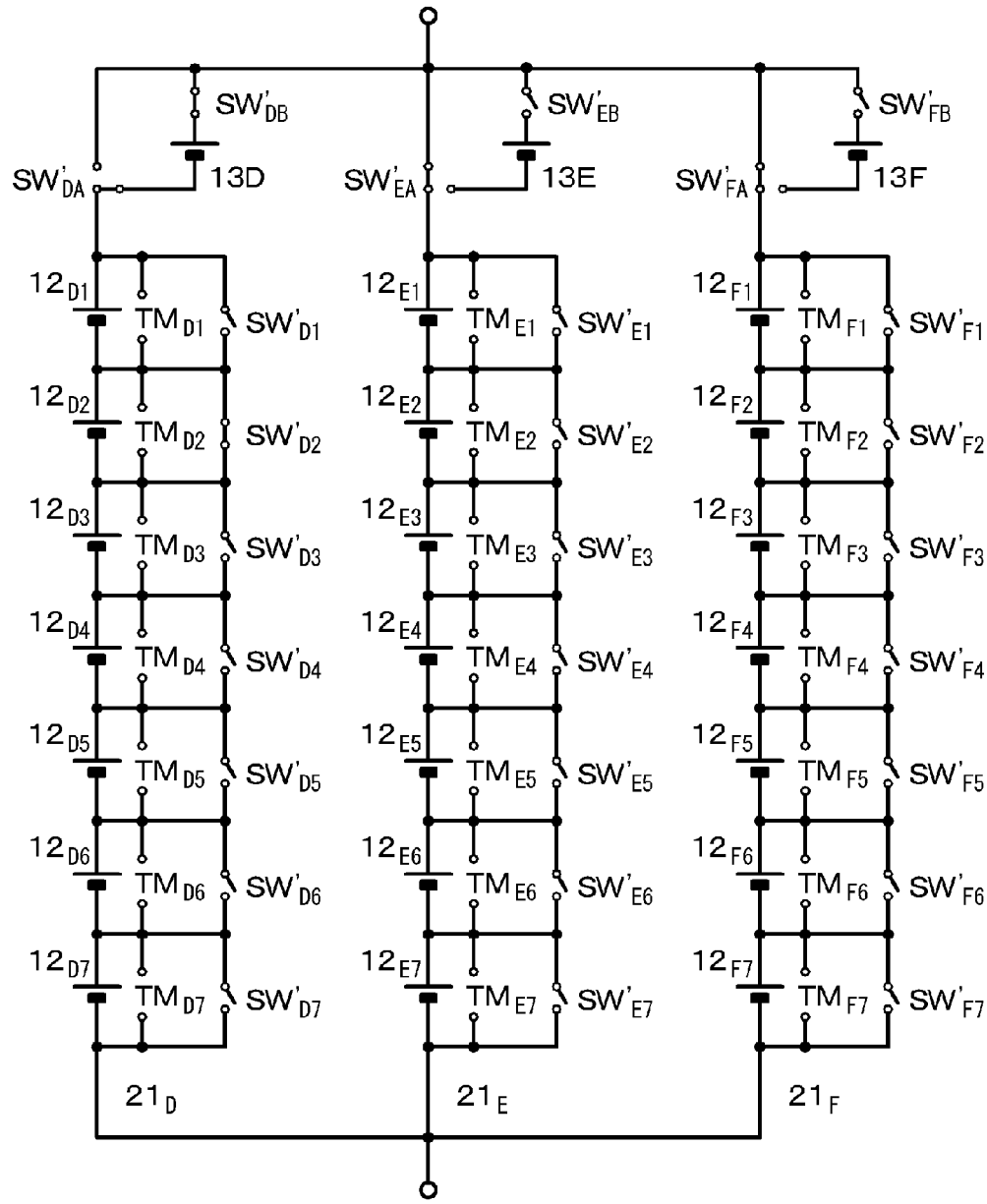
FIG. 9 is a conceptual view when there is an abnormality in a secondary battery cell in the battery pack of the second embodiment.

Hereinafter, the method for charging/discharging the battery pack of the second embodiment will be described with reference to FIGS. 9 to 11 that are conceptual views of the battery pack.

In the method for charging/discharging the secondary battery cells of the second embodiment, during charging/discharging, when there is no abnormality in the secondary battery cells, the auxiliary charging/discharging device 13 is connected in parallel to any secondary battery cell 12. In detail, during charging, when there is no abnormality in the secondary battery cells, the auxiliary charging/discharging device 13 is connected in parallel to the secondary battery cell 12 having the highest voltage between its both ends. During charging, the voltages across the secondary battery cells 12 are measured by the voltage measurement device 14 at all times, and a state of charge of the secondary battery cell 12 is monitored at all times. Thus, the voltage measurement device 14 evaluates a result of measuring the voltages across the secondary battery cells 12 at desired intervals of time.

Figure 10:
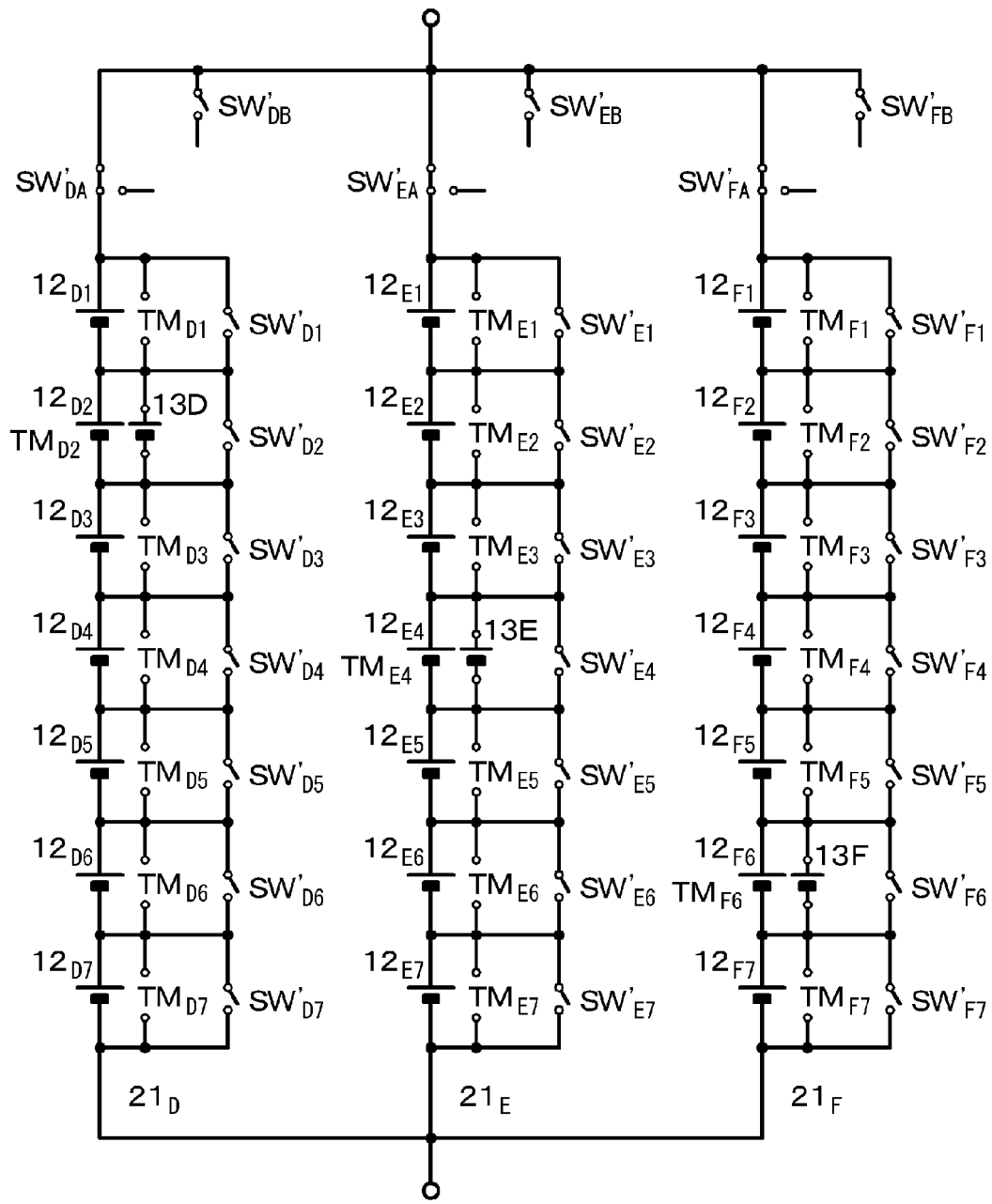
FIG. 10 is a conceptual view of the battery pack of the second embodiment during charging.
Figure 11:
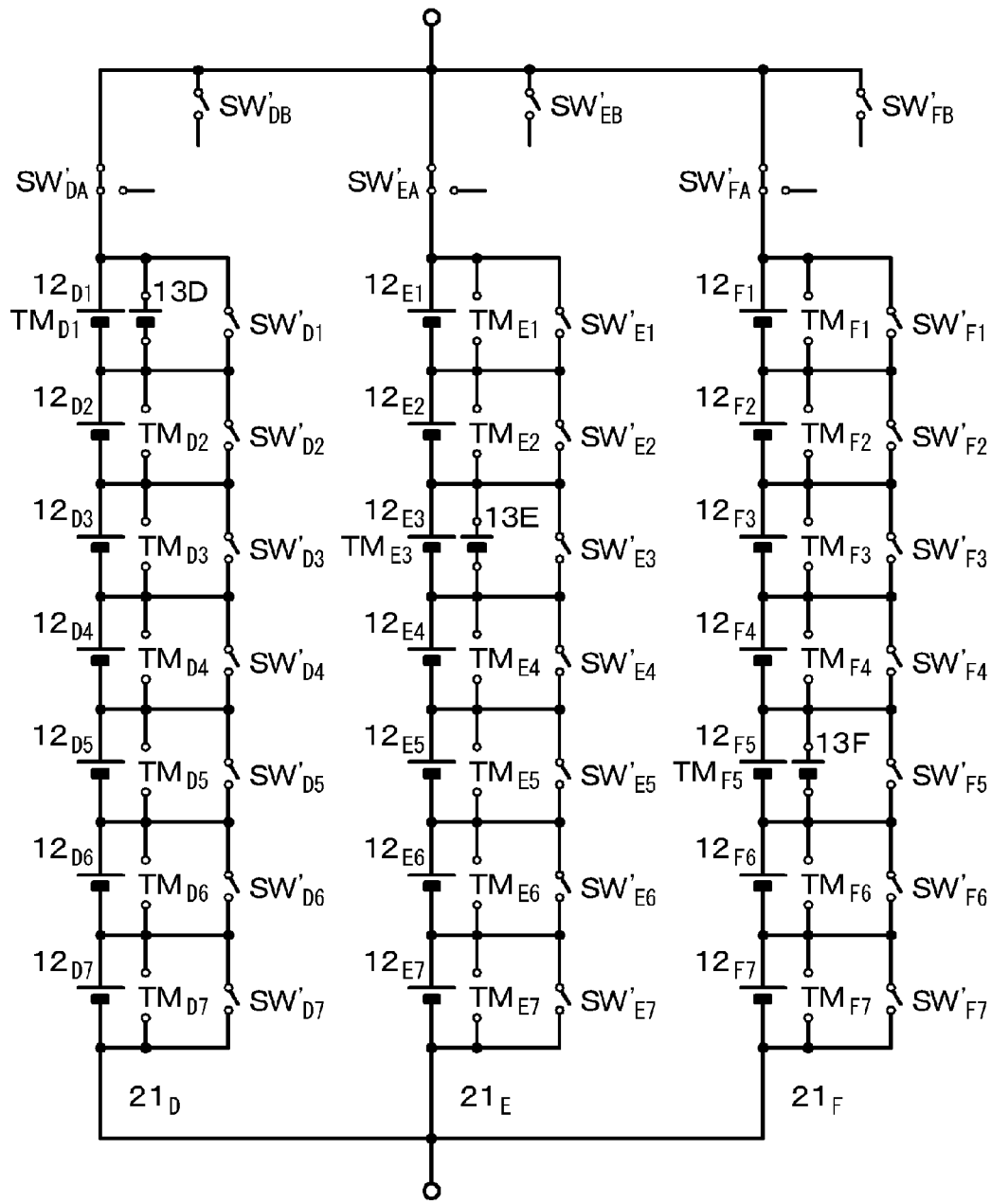
FIG. 11 is a conceptual view of the battery pack of the second embodiment during discharging.

For example, as shown in FIG. 10, when the voltage across the secondary battery cell $12_{D2}$ in the secondary battery cell serial module $21_D$, the voltage across the secondary battery cell $12_{E4}$ in the secondary battery cell serial module $21_E$, and the voltage across the secondary battery cell $12_{F6}$ in the secondary battery cell serial module $21_F$ are highest values, the auxiliary charging/discharging devices 13D, 13E, and 13F are connected in parallel to the secondary battery cell $12_{D2}$, $12_{E4}$, $12_{F6}$ via the on/off control means (not shown) and the terminal parts $TM_{D2}$, $TM_{E4}$, and $TM_F6$ under the control of the voltage measurement device 14. Thus, the auxiliary charging/discharging devices 13D, 13E, and 13F are connected in parallel, and thereby a charging speed in the secondary battery cell 12 in which the voltage between its both ends is the highest value becomes slow. As a result, the uniformity of the nature and the voltage across the secondary battery cell can be achieved, and the equilibrium of cell balance can be achieved. The auxiliary charging/discharging devices 13D, 13E, and 13F, each of which is made up of the secondary battery cell, can be charged. In addition, states of charge (SOCs) of the auxiliary charging/discharging devices 13D, 13E, and 13F made up of the secondary battery cell can be held to the same extent as the secondary battery cell. The abnormal secondary battery cell can be replaced at any time, and can be exchanged and used smoothly.

As the charge of the battery pack progresses, the secondary battery cell in which the voltage between its both ends is the highest value is also changed in the secondary battery cell serial module. The voltage measurement device 14 evaluates the result of measuring the voltages across the secondary battery cells 12 at desired intervals of time, and the auxiliary charging/discharging devices 13 are connected in parallel to the secondary battery cell in which the voltage between its both ends is the highest value. This operation is sequentially repeated to complete the charge of the battery pack.

On the other hand, during discharging, when there is no abnormality in the secondary battery cells, the auxiliary charging/discharging devices 13 are connected in parallel to the secondary battery cell having the lowest voltage between its both ends. For example, as shown in FIG. 11, when the voltage across the secondary battery cell $12_{D1}$ in the secondary battery cell serial module $21_D$, the voltage across the secondary battery cell $12_{E3}$ in the secondary battery cell serial module $21_E$, and the voltage across the secondary battery cell $12_{F5}$ in the secondary battery cell serial module $21_F$ are the lowest values, the auxiliary charging/discharging devices 13D, 13E, and 13F are connected in parallel to the secondary battery cells $12_{D1}$, $12_{E3}$, and $12_{F5}$ via the on/off control means (not shown) and the terminal parts $TM_{D1}$, $TM_{E3}$, and $TM_{F5}$ under the control of the voltage measurement device 14. Thus, the auxiliary charging/discharging devices 13D, 13E, and 13F are connected in parallel, and thereby a discharging speed in the secondary battery cells $12_{D1}$, $12_{E3}$, and $12_{F5}$ in which the voltages between its both ends are the lowest values becomes slow. As a result, the uniformity of the nature and the voltage across the secondary battery cell can be achieved, and the equilibrium of cell balance can be achieved. The auxiliary charging/discharging devices 13D, 13E, and 13F, each of which is made up of the secondary battery cell, contribute to the discharge. That is, the auxiliary charging/discharging devices 13D, 13E, and 13F operate as additional capacities in the secondary battery cell serial module.

As the discharge of the battery pack progresses, the secondary battery cells in which the voltages between its both ends are the lowest values are also changed. Accordingly, the voltage measurement device 14 evaluates a result of measuring the voltages across the secondary battery cells 12 at desired intervals of time. The auxiliary charging/discharging devices 13 are connected in parallel to the secondary battery cells in which the voltages between its both ends are the lowest values. This operation is sequentially repeated to complete the discharge of the battery pack.

During charging/discharging, when it is detected that there is an abnormality in any secondary battery cell (in the example shown in FIG. 9, when there is an abnormality in the secondary battery cell $12_{D2}$), opposite ends of the secondary battery cell $12_{D2}$ at which the abnormality has arisen are short-circuited, and the auxiliary charging/discharging device 13D is connected in series to the secondary battery cell serial module $21_D$. In detail, under the control of the voltage measurement device 14, the second on/off control means $SW'_{D2}$ is set to the conduction state, and the opposite ends of the secondary battery cell $12_{D2}$ at which the abnormality has arisen are short-circuited. Thus, under the control of the voltage measurement device 14, the auxiliary charging/discharging device 13D is connected in series to the secondary battery cell serial module $21_D$ including the secondary battery cell $12_{D2}$ at which the abnormality has arisen, more particularly one end of the secondary battery cell serial module $21_D$, via the third on/off control means $SW'_{DA}$ and $SW'_{DB}$. Thus, an operation of the secondary battery cell serial module $21_D$ exerts a charging/discharging function that is equivalent to that before the abnormality arose at the secondary battery cell. Note that, in FIG. 9, the illustration of connection states of the auxiliary charging/discharging devices 13E and 13F in the other secondary battery cell serial modules $21_E$ and $21_F$ is omitted.

Then, in this state, without carrying out the method for charging/discharging the battery pack of the second embodiment, the charge/discharge in the conventional battery pack is performed. In this way, when there is an abnormal secondary battery cell, it is preferable to give a sign of warning that the exchange or maintenance of the secondary battery cell is required, and to call a user's attention. Further, when a plurality of auxiliary charging/discharging devices 13 are provided for one secondary battery cell serial module, the method for charging/discharging the battery pack of the second embodiment may also be carried out in this state.

In this way, in the battery pack of the second embodiment or in the method for charging/discharging the same, during charging/discharging the secondary battery cells, the auxiliary charging/discharging devices can also contribute to the charge/discharge. In the charge/discharge of the entire battery pack in which the plurality of secondary battery cells are connected, the optimization of cell balance can be achieved. The efficiency of the charge/discharge of the entire battery pack can be achieved. Further, in the battery pack of the second embodiment or in the method for charging/discharging the same, during charging/discharging, when there is an abnormality in any secondary battery cell, the secondary battery cell at which the abnormality has arisen is disconnected from the secondary battery cell serial module, and the auxiliary charging/discharging device is connected in series to the secondary battery cell serial module. As such, the battery pack can be used without interruption, and the auxiliary charging/discharging device can function as a protection device having redundancy. A greater burden can be prevented from being imposed on the secondary battery cells constituting the secondary battery cell parallel module, and the secondary battery cell serial module can be maintained in the same use state as before the abnormality arose at the secondary battery cell.

Figure 12:
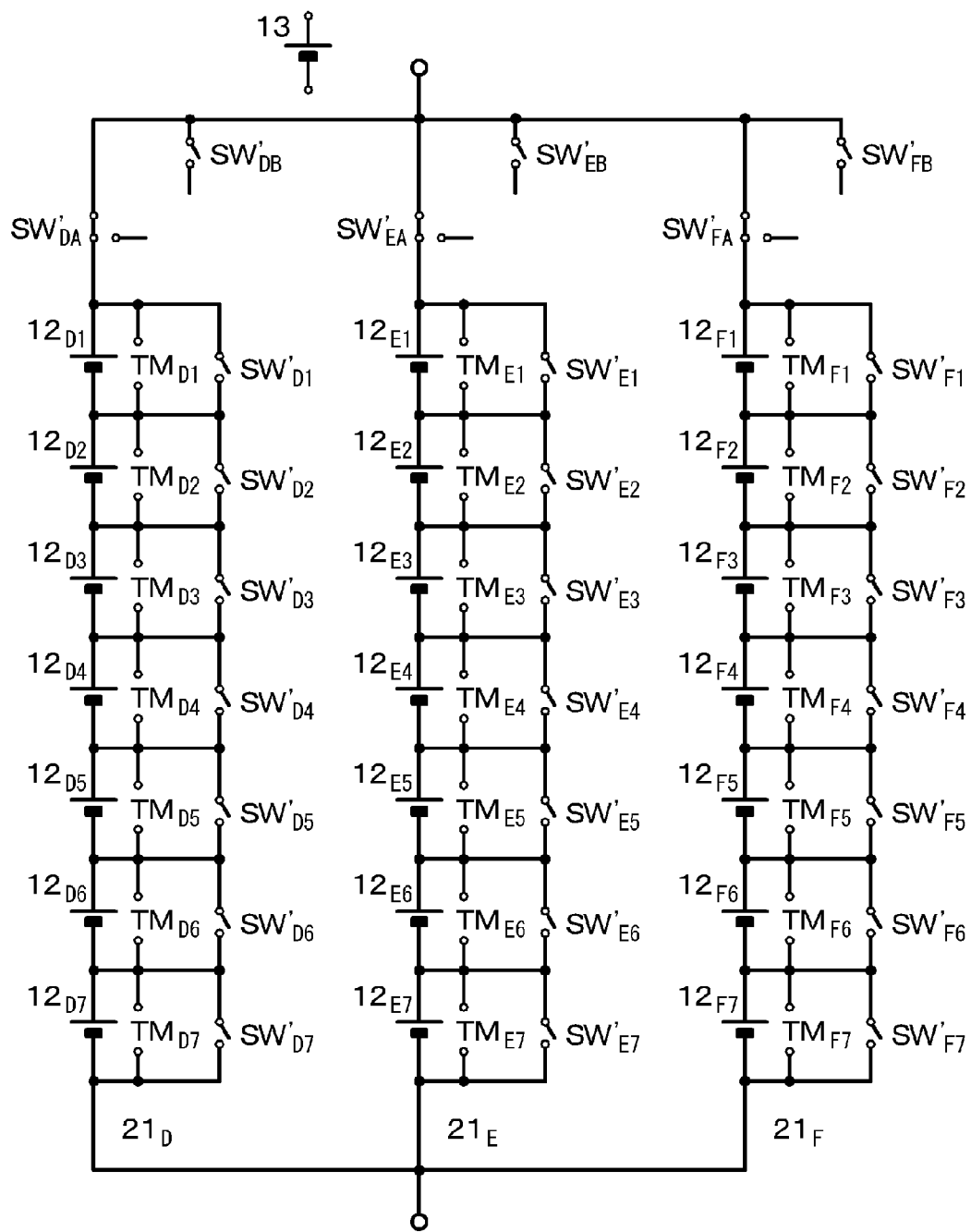
FIG. 12 is a conceptual view of a modification of the battery pack of the second embodiment.

As shown in FIG. 12, one auxiliary charging/discharging device 13 may be disposed for a plurality of secondary battery cell serial modules.

Figure 13:
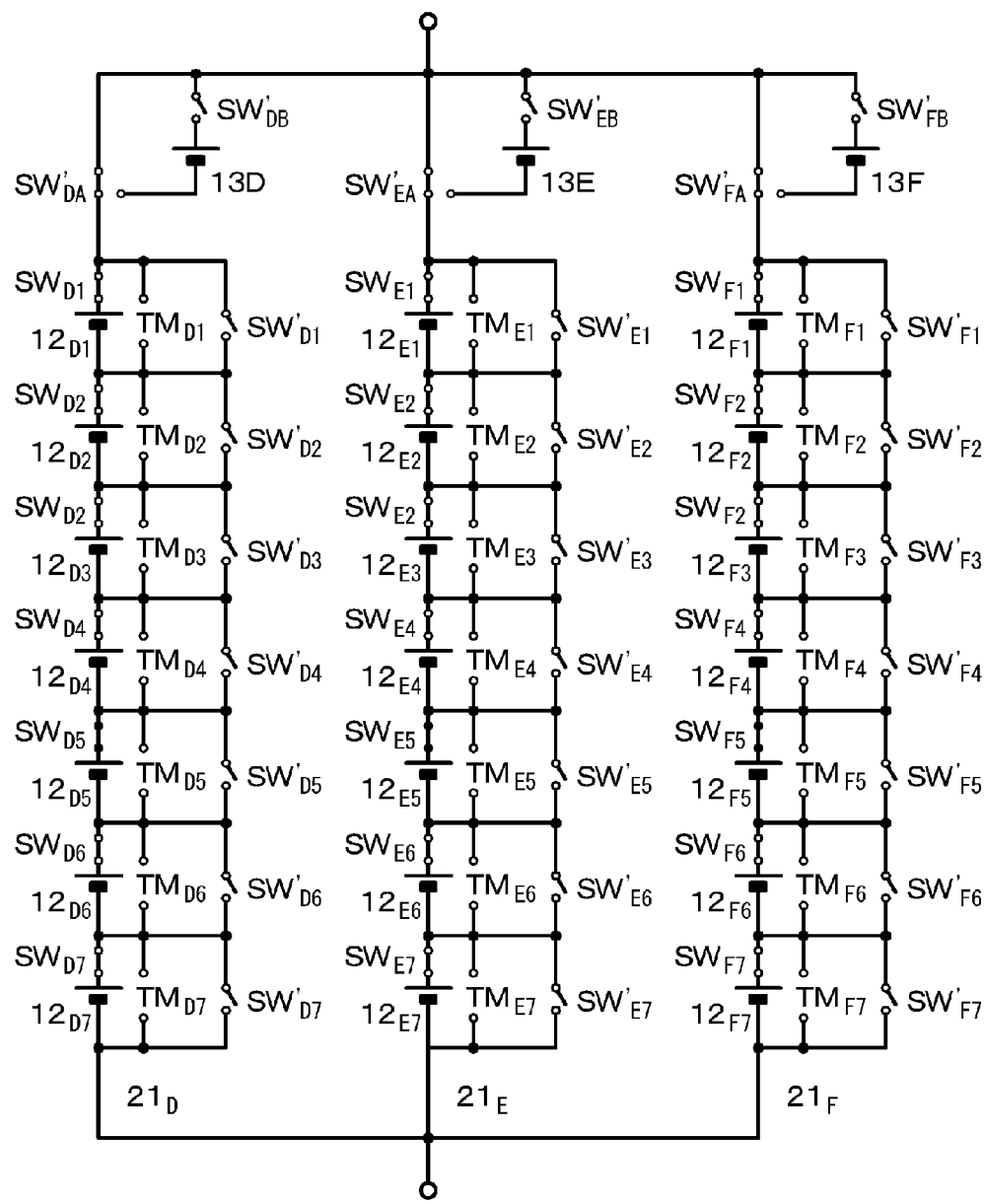
FIG. 13 is a conceptual view of another modification of the battery pack of the second embodiment.

Further, as shown in FIG. 13, like the first embodiment, switching means SW are installed on one ends of the respective secondary battery cells. Based on operations of the switching means SW (switching means $SW_{D1}$, $SW_{D2}$, $SW_{D3}$, $SW_{D4}$, $SW_{D5}$, $SW_{D6}$, $SW_{D7}$, $SW_{E1}$, $SW_{E2}$, $SW_{E3}$, $SW_{E4}$, $SW_{E5}$, $SW_{E6}$, $SW_{E7}$, $SW_{F1}$, $SW_{F2}$, $SW_{F3}$, $SW_{F4}$, $SW_{F5}$, $SW_{F6}$, and $SW_{F7}$), the secondary battery cell at which the abnormality has arisen may be configured to be disconnected from the secondary battery cell serial module. In detail, for example, the connection to the secondary battery cell at which the abnormality has arisen in the secondary battery cell serial module is physically released. Thus, in this case, like the first embodiment, the voltage across each switching means SW is measured. Thereby, it is possible to detect whether or not the abnormality of the secondary battery cell occurs. The control of the switching means SW may be performed by the voltage measurement device 14, or by providing a switching means control device. Alternatively, the temperature of the secondary battery cell is measured, and thereby it may be detected whether or not the abnormality of the secondary battery cell occurs.

Further, as the method of detecting the abnormal secondary battery cell, in addition to the method of using the above-mentioned switching means, like the first embodiment, a method of instantly setting the switching means to the nonconduction state in one of the secondary battery cells, setting the switching means to the conduction state in all the remaining secondary battery cells, and checking a state of variation in an open circuit voltage of the secondary battery cell in which the switching means is set to the nonconduction state based on, for instance, the voltage measurement device 14 may be employed. Thus, by performing this operation on all the secondary battery cells, the secondary battery cell at which the abnormality has arisen can be detected.

Alternatively, an abnormality detection circuit (e.g., an abnormality detection circuit made up of a resistor and an analog/digital converter (ADC)) that detects the abnormality of the secondary battery cell may be installed on the auxiliary charging/discharging device 13. The abnormality detection circuit is connected in series to the auxiliary charging/discharging device 13. Thus, when there is an abnormality in current flowing through the abnormality detection circuit, it is possible to know that an abnormality has arisen at the secondary battery cell to which the auxiliary charging/discharging device 13 is connected in parallel.

Although the present technology has been described based on the preferred embodiments, the present technology is not limited to these embodiments. The configurations, the structures, and the connection relationships of the battery pack, the battery assembly, the secondary battery cell, the auxiliary charging/discharging device, and the voltage measurement device described in the embodiments are illustrative, and may be appropriately modified. In the present technology, the battery pack may be applied to, for example, such power consumption devices as electric automobiles (including hybrid cars), golf carts, electric carts, electric motorcycles, electric power-assisted bicycles, railroad vehicles. Thus, to drive a conversion device (particularly, for example, a motor) which is provided in these and which converts power into a driving force by supplying the power, the battery pack can be discharged, or be charged using energy generated from such a device. These power consumption devices are each provided with, for instance, a control device including a battery level display, or a control device that conducts information processing associated with the control of the power consumption device on the basis of information about the secondary battery cell.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

10 Battery assembly
12, $12_{11}$ to $12_{73}$, $12_{D1}$ to $12_{F7}$ Secondary battery cell
11, $11_1$ to $11_7$ Secondary battery cell parallel module
13, 13D, 13E, 13F Auxiliary charging/discharging device
14 Voltage measurement device
15 Charging/discharging control circuit
16 Connector
21, $21_D$ to $21_F$ Secondary battery cell serial module
SW, $SW_{11}$ to $SW_{73}$, $SW_{D1}$ to $SW_{F7}$ Switching means
SW-A, SW-B, SW-$A_1$ to SW-$A_7$, SW-$B_1$ to SW-$B_7$ Second switching means
TM, $TM_{D1}$ to $TM_{F7}$ Terminal part
SW', $SW'_{D1}$ to $SW'_{F7}$ Second on/off control means
$SW'_{DA}$ to $SW'_{FB}$ Third on/off control means

The invention claimed is:

1. A method, comprising:
one of charging or discharging a battery pack having an auxiliary charging/discharging device and a battery assembly in which a plurality of secondary battery cell modules are configured to be connected in series, wherein each of the plurality of secondary battery cell modules includes a plurality of secondary battery cells configured to be connected in parallel,
detecting an abnormality in a first secondary battery cell of the plurality of secondary battery cells during one of the charging or the discharging; and
based on the detection of the abnormality:
releasing a connection of the first secondary battery cell in a first secondary battery cell module of the plurality of secondary battery cell modules, and
connecting the auxiliary charging/discharging device in parallel to the first secondary battery cell module.

2. The method according to claim 1, further comprising:
detecting whether the plurality of secondary battery cells are faultless during one of the charging or the discharging; and
based on the detection that the plurality of secondary battery cells are faultless, connecting the auxiliary charging/discharging device in parallel to at least one of the plurality of secondary battery cell modules,
wherein, based on the detection that the plurality of secondary battery cells are faultless during the charging, the auxiliary charging/discharging device is further configured to be connected in parallel to a second secondary battery cell module of the plurality of secondary battery cell modules, having a highest voltage between both ends thereof.

3. The method according to claim 2, wherein, based on the detection that the plurality of secondary battery cells are faultless during the discharging, the auxiliary charging/discharging device is further configured to be connected in parallel to a third secondary battery cell module, of the plurality of secondary battery cell modules, having a lowest voltage between both ends thereof.

4. A method, comprising:
one of charging or discharging a battery pack having an auxiliary charging/discharging device and a secondary battery cell module including a plurality of secondary battery cells configured to be connected in parallel;
detecting an abnormality in a first secondary battery cell of the plurality of secondary battery cells during one of the charging or the discharging; and
based on the detection of the abnormality:
short-circuiting both ends of the first secondary battery cell of the secondary battery cell module, and
connecting the auxiliary charging/discharging device in parallel to the secondary battery cell module.

5. The method according to claim 4, further comprising:
detecting whether the plurality of secondary battery cells are faultless during one of the charging or the discharging; and
based on the detection that the plurality of secondary battery cells are faultless, connecting the auxiliary charging/discharging device in parallel to at least one of the plurality of secondary battery cells,
wherein, based on the detection that the plurality of secondary battery cells are faultless during the charging, the auxiliary charging/discharging device is further configured to be connected in parallel to a second secondary battery cell of the plurality of secondary battery cells, having a highest voltage between both ends thereof.

6. The method according to claim 5, wherein, based on the detection that the plurality of secondary battery cells are faultless during the discharging, the auxiliary charging/discharging device is further configured to be connected in parallel to a third secondary battery cell, of the plurality of secondary battery cells, having a lowest voltage between both ends thereof.

7. A battery pack, comprising:
a battery assembly which includes a plurality of secondary battery cell modules, each of the plurality of secondary battery cell modules includes a plurality of secondary battery cells, wherein the plurality of secondary battery cells are interconnected in a parallel connection, and wherein the plurality of secondary battery cell modules are interconnected in a series connection; and
an auxiliary charging/discharging device, wherein the auxiliary charging/discharging device is configured to be connected in parallel to at least one of the plurality of secondary battery cell modules,
wherein based on a first detection that the plurality of secondary battery cells are faultless during one of charge or discharge of the battery pack, the auxiliary charging/discharging device is further configured to be connected in parallel to at least one of the plurality of secondary battery cell modules, and
based on a second detection that there is an abnormality in a first secondary battery cell of the plurality of secondary battery cells during one of the charge or the discharge of the battery pack:
a connection of the first secondary battery cell, at which the abnormality has arisen, in a first secondary battery cell module of the plurality of secondary battery cell modules is released, and
the auxiliary charging/discharging device is further configured to be connected in parallel to the first secondary battery cell module.

8. The battery pack according to claim 7, wherein, based on the first detection that the plurality of secondary battery cells are faultless during the charge of the battery pack, the auxiliary charging/discharging device is further configured to be connected in parallel to a second secondary battery cell module of the plurality of secondary battery cell modules, of the plurality of secondary battery cell modules, having a highest voltage between both ends thereof.

9. The battery pack according to claim 7, wherein, based on the first detection that the plurality of secondary battery cells are faultless during the discharge of the battery pack, the auxiliary charging/discharging device is further configured to be connected in parallel to a third secondary battery cell module, of the plurality of secondary battery cell modules, having a lowest voltage between both ends thereof.

10. The battery pack according to claim 7,
wherein a switching device is installed on at least one end of each of the plurality of secondary battery cells; and
based on an operation of the switching device, the connection of the first secondary battery cell at which the abnormality has arisen is configured to be released.

11. The battery pack according to claim 10,
wherein a voltage across the switching device is configured to be measured to detect whether the abnormality has arisen in the first secondary battery cell.

12. The battery pack according to claim 7, further comprising a voltage measurement device configured to measure voltages across each of the plurality of secondary battery cell modules.

13. A battery pack, comprising:
a secondary battery cell module including a plurality of secondary battery cells configured to be connected in parallel; and
an auxiliary charging/discharging device, wherein, based on a first detection that there is an abnormality in a first secondary battery cell of the plurality of secondary battery cells during one of charge or discharge of the battery pack:
  the first secondary battery cell is configured to be disconnected from the secondary battery cell module, and
  the auxiliary charging/discharging device is configured to be connected in parallel to the secondary battery cell module.

14. The battery pack according to claim 13, wherein further comprising:
  based on a second detection that the plurality of secondary battery cells are faultless during one of the charge or the discharge of the battery pack, the auxiliary charging/discharging device is further configured to be connected in parallel to at least one of the plurality of secondary battery cells, and
  wherein based on the second detection that the plurality of secondary battery cells are faultless during the charge of the battery pack, the auxiliary charging/discharging device is further configured to be connected in parallel to a second secondary battery cell, of the plurality of secondary battery cells, having a highest voltage between both ends thereof.

15. The battery pack according to claim 14, wherein, based on the second detection that the plurality of secondary battery cells are faultless during the discharge of the battery pack, the auxiliary charging/discharging device is further configured to be connected in parallel to a third secondary battery cell, of the plurality of secondary battery cells, having a lowest voltage between both ends thereof.

16. The battery pack according to claim 13,
  wherein each of the plurality of secondary battery cells includes a switching device; and
  based on an operation of the switching device, both ends of the first secondary battery cell at which the abnormality has arisen are short-circuited.

17. The battery pack according to claim 16, wherein a voltage across the switching device is configured to be measured to detect whether the abnormality has arisen in the first secondary battery cell.

18. A power consumption device, comprising:
  a battery pack,
  wherein the battery pack includes:
    a battery assembly which includes a plurality of secondary battery cell modules, each of the plurality of secondary battery cell modules includes a plurality of secondary battery cells, wherein the plurality of secondary battery cells are interconnected in a parallel connection, and wherein the plurality of secondary battery cell modules are interconnected in a series connection; and
    an auxiliary charging/discharging device, wherein the auxiliary charging/discharging device is configured to be connected in parallel to at least one of the plurality of secondary battery cell modules,
  wherein based on a first detection that the plurality of secondary battery cells are faultless during one of charge or discharge of the battery pack, the auxiliary charging/discharging device is further configured to be connected in parallel to at least one of the plurality of secondary battery cell modules, and
  based on a second detection that there is an abnormality in a first secondary battery cell of the plurality of secondary battery cells during one of the charge or the discharge of the battery pack:
    a connection of the first secondary battery cell, at which the abnormality has arisen, in a first secondary battery cell module of the plurality of secondary battery cell modules is released, and
    the auxiliary charging/discharging device is further configured to be connected in parallel to the first secondary battery cell module.

* * * * *